United States Patent
Kennedy et al.

(10) Patent No.: US 9,975,971 B2
(45) Date of Patent: May 22, 2018

(54) PREPARATION OF POLYISOBUTYLENE-BASED POLYMER NETWORKS BY THIOL-ENE CHEMISTRY

(71) Applicants: Joseph Kennedy, Akron, OH (US); Turgut Nugay, Istanbul (TR); Nihan Nugay, Istanbul (TR)

(72) Inventors: Joseph Kennedy, Akron, OH (US); Turgut Nugay, Istanbul (TR); Nihan Nugay, Istanbul (TR)

(73) Assignee: The University of Akron, Akron, OH (US)

( * ) Notice: Subject to any disclaimer, the term of this patent is extended or adjusted under 35 U.S.C. 154(b) by 166 days.

(21) Appl. No.: 14/769,709

(22) PCT Filed: Mar. 4, 2014

(86) PCT No.: PCT/US2014/020208
§ 371 (c)(1),
(2) Date: Aug. 21, 2015

(87) PCT Pub. No.: WO2014/138017
PCT Pub. Date: Sep. 12, 2014

(65) Prior Publication Data
US 2016/0002373 A1    Jan. 7, 2016

Related U.S. Application Data

(60) Provisional application No. 61/772,030, filed on Mar. 4, 2013, provisional application No. 61/772,143, filed on Mar. 4, 2013.

(51) Int. Cl.
| | | |
|---|---|---|
| C08F 110/10 | (2006.01) | |
| C08K 5/37 | (2006.01) | |
| C08G 75/045 | (2016.01) | |
| C08G 75/04 | (2016.01) | |
| C08F 10/10 | (2006.01) | |
| C08F 299/00 | (2006.01) | |

(52) U.S. Cl.
CPC ............ *C08F 110/10* (2013.01); *C08F 10/10* (2013.01); *C08F 299/00* (2013.01); *C08G 75/04* (2013.01); *C08G 75/045* (2013.01); *C08K 5/37* (2013.01)

(58) Field of Classification Search
CPC ...... C08F 10/10; C08F 110/10; C08F 210/10; C08F 299/00; C08K 5/37; C08G 75/04; C08G 75/045; C08G 81/02; C08G 81/021; C08G 81/022; C08G 85/002; C08L 23/20; C08L 23/32
See application file for complete search history.

(56) References Cited

U.S. PATENT DOCUMENTS

| | | |
|---|---|---|
| 2007/0203302 A1 | 8/2007 | Kennedy et al. |
| 2007/0208099 A1 | 9/2007 | Herr et al. |
| 2008/0199420 A1 | 8/2008 | Wendel et al. |
| 2011/0077407 A1 | 3/2011 | David et al. |

OTHER PUBLICATIONS

Nuyken et al., Polymer Bulletin 4 (1981) 61-65.*
Wang et al., Polymer Bulletin 17 (1987) 205-211.*
Kennedy et al., Polymer Bulletin 1 (1979) 575-580.*
Boileau et al., European Polymer Journal 39 (2003) 1395-1404.*
Wang, et al., "Living carbocationic polymerization XII. Telechelic polyisobutylenes by a sterically hindered bifunctional initiator." Polymer Bulletin vol. 17, pp. 205-211 (1987).

* cited by examiner

*Primary Examiner* — Roberto Rabago
(74) *Attorney, Agent, or Firm* — Renner Kenner Greive Bobak Taylor & Weber

(57) ABSTRACT

A PIB-based polymer network includes at least one sulfur containing segment and at least two PIB polymer segments. The at least two PIB polymer segments each include a core and at least two polyisobutylene polymer chains extending therefrom. The at least one sulfur containing segment includes at least one sulfur atom that is located between any two polyisobutylene polymer chains from two different PIB polymer segments, so that the sulfur containing segment connects those two different PIB polymer segments together. The PIB-based polymer network is produced by the thiol-ene reaction in the presence of light or heat. The reaction products include at least two polyisobutylene polymer precursor moieties, each polyisobutylene polymer precursor moiety having at least two end group selected from the end groups —$CH_2$—$CH(CH_3)$=$CH_2$, —$CH_2$=$C(CH_3)_2$, and —$CH_2$—$CH$=$CH_2$; and at least one multi-functional thiol.

14 Claims, 4 Drawing Sheets

PREPARATION OF POLYISOBUTYLENE-BASED POLYMER NETWORKS BY THIOL-ENE CHEMISTRY

CROSS REFERENCE TO RELATED APPLICATIONS

This application claims the benefit of U.S. provisional patent application Ser. No. 61/772,030 entitled "Extension of Linear PIBs to Higher Molecular Weight Products, and the Preparation of PIB Networks By Thiol-Ene Chemistry," filed Mar. 4, 2013 and U.S. provisional patent application Ser. No. 61/772,143 entitled "Photochemical Preparation of Novel Hydroxyl-Terminated Polyisobutylenes and Their Use for the Preparation of Polyurethanes," filed Mar. 4, 2013, the disclosures of both of which are incorporated herein by reference in their entirety.

FIELD OF THE INVENTION

The present invention relates to extended linear polyisobutylenes and polyisobutylene (PIB) networks. More particularly, the present invention relates to linear PIBs and PIB networks crosslinked with sulfur-containing moieties such as multi-functional thiols. The preparation of these extended linear PIBs and PIB networks is also provided.

BACKGROUND OF THE INVENTION

The preparation of linear polyisobutylenes and polyisobutylene networks are generally known in the art. That is, by providing a functionalized end group to the ends of a polyisobutylene (PIB) polymer and reacting that functionalized end group with a compatible functional group that is present on or in a linking agent, a network of PIB polymers may be formed, connected by a linking segment resulting from the reacted linking agent. Oftentimes, the linking agent is itself a functionalized polymer other than PIB, such that the polymer networks are co-polymer networks.

Where the polyisobutylene polymer has two functionalized end groups, and the linking agent has two functionalities known to be compatible with the functionalized end groups of the polyisobutylene polymer, it will be appreciated that an extended linear polyisobutylene polymer of a much higher molecular weight can be obtained with the linking segments formed from the linking agent provided between the various original length polyisobutylene polymers. For the purposes of this invention, such an extended length/linear polyisobutylene polymer will fall within those moieties defined as a polyisobutylene-based polymer network as the term is herein used. However, it will be appreciated that not all polyisobutylene-based polymer networks are extended length/linear polyisobutylene polymers.

In other instances, where either the polyisobutylene polymer or the linking agent has three or more functionalizations and the other of the polyisobutyelene polymer and the linking agent has two or more functionalizations, it will be appreciated that polymer networks that are not linear can be formed. Such structures are defined herein as PIB networks. Such structures also fall within the definition of a polyisobutylene-based polymer network. However, again, not all polyisobutylene-based polymer networks are PIB networks. Thus, for purposes of this invention, the term "polyisobutylene-based polymer network" may be defined broadly as an aggregation of polyisobutylene polymers or segments that have been chemically linked to each other by various linking segments. Such polyisobutylene-based polymer networks include, inter alia, extended length/linear PIB polymers and a PIB networks.

Such polyisobutylene-based polymer networks are believed to have a various uses, depending upon their nature. For example, some polyisobutylene (PIB)-based polymer networks are known to be useful as medical device coatings within the human body. Other PIB-based polymer networks are seen as useful for corrosion protection for metal and other surfaces. Still other PIB-based polymer networks are believed to provide excellent wound coatings for skin or provide excellent water repellent coatings for the skin or other surfaces.

However, many of the currently known PIB-based polymer networks are somewhat expensive to manufacture. Accordingly, providing new PIB-based polymer networks that are useful for one or more of the uses noted above, or any other desired uses, would be desirable to the industry.

Accordingly, there is a need in the art for a simple and cost effective way to produce new PIB-based polymer networks. Novel PIB-based polymer networks are desired throughout several industries.

SUMMARY OF THE INVENTION

In general terms, the present invention relates to the formation of higher molecular weight or extended length linear polyisobutylenes (PIBs) and PIB networks by reacting multi-functional polyisobutylenes carrying exo-, endo-, or allyl-terminal unsaturations with multi-functional thiols in the presence of light, such as UV light, or heat. It has been discovered that a thiol-ene click reaction can be readily employed for the preparation of high MW linear rubbery PIBs from lower molecular weight liquid PIB precursors ("liquid rubber technology"). It has also been discovered that these same thiol-ene reactions can be used for the preparation of PIB networks, useful for making corrosion resistant coatings for metal surfaces and water-repellent wound dressings on living skin.

It will be appreciated that polyisobutylenes with external (exo-) and internal (endo-) terminated unsaturations are always formed in conventional (non-living) isobutylene polymerizations. That is, the conventional polymerization of isobutylene will always result (unless otherwise manipulated) in the polyisobutylenes being terminated with one of two possible end groups, namely exo unsaturation, identified by the chemical structure PIB-$CH_2$—$C(CH_3)$=$CH_2$, or endo unsaturation, identified by the chemical structure PIB-CH=$C(CH_3)_2$. The exo unsaturation end group is often called a vinylidene group, and may be abbreviated herein with the designation -V. The endo unsaturation end group may be abbreviated herein with the designation -E.

These unsaturated -V and -E end groups arise because of ever-present chain transfer reactions in isobutylene polymerizations. In most conventional (non-living) polymerizations, the polymerization reaction will roughly provide about 70% exo unsaturation (-V end groups) and about 30% endo unsaturation (-E end groups). Notably, this ratio is rather insensitive to changes in reaction parameters, e.g., solvent used, temperature, reagent concentrations, etc.

It will be further appreciated that, with an additional reaction step, the polyisobutylenes with allyl end groups (-allyl), identified by the structure PIB-$CH_2$—CH=$CH_2$, can be obtained and used in the present invention. The production of ally-terminated PIBs is well known in the art as can be generally understood based upon a review of Kennedy et al. U.S. Pat. No. 4,758,631, the disclosure of which is incorporated herein by reference.

It is appreciated that thiols are commonly defined as any organosulfur compound having a carbon-bonded —SH group, such as C—SH or R—SH, wherein R is alkane, alkene, or other carbon-containing group of atoms. However, for the purposes of this invention, a thiol will also include hydrogen sulfide, H—S—H, inasmuch as this moiety is also multi-functional.

Advantages of the present invention over existing prior art relating to telechelic PIBs and PIBs for use in the production of polyurethanes and polyureas, which shall become apparent from the description which follows, are accomplished by the invention as hereinafter described and claimed.

One aspect of the present invention provides a PIB-based polymer network including at least one sulfur containing segment and at least two PIB polymer segments. The at least two PIB polymer segments each include a core and at least two polyisobutylene polymer chains extending therefrom. The at least one sulfur containing segment includes at least one sulfur atom that is located between any two polyisobutylene polymer chains from two different PIB polymer segments. As such, the sulfur containing segment connects those two polyisobutylene polymer chains of two different PIB polymer segments together, thereby connecting the two PIB polymer segments together by way of the sulfur-containing segment.

In one or more embodiments, the at least one sulfur segment includes at least two sulfur atoms between any two polyisobutylene polymer chains from two different PIB polymer segments. In various embodiments requiring at least two sulfur atoms between any two polyisobutylene polymer chains from two different PIB polymer segments, the PIB-based polymer networks may have any of the formulas:

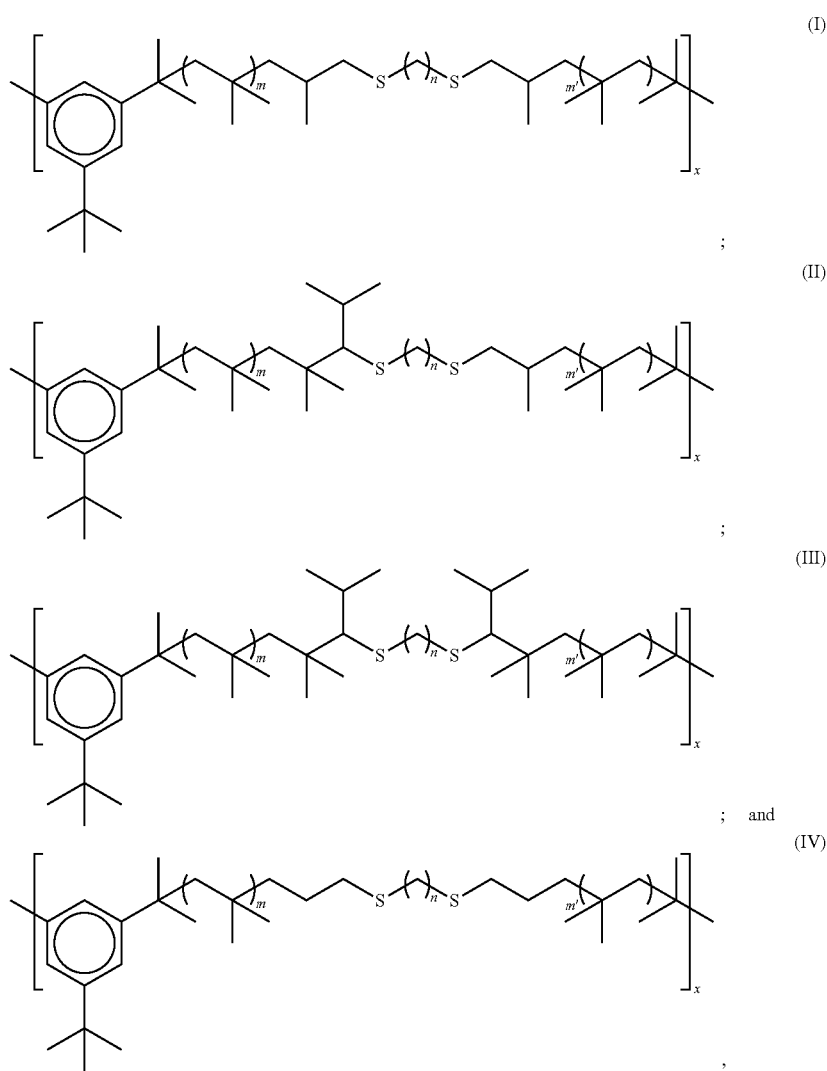

wherein m, m', and X are each an integer from 2 to 5,000 and n is an integer from 1 to 12. In some embodiments, X may be from 2 to 50,000. It will be appreciated that the structures of the end groups of the polyisobutylene polymer precursor moieties being used will determine which formula structure the PIB-based polymer network will take. For example, if the polyisobutylene chains of both polymer precursor moieties being connected by the sulfur containing segment include exo terminal unsaturations, then the resultant PIB-based polymer network will take form of formula (I). If the polyisobutylene chains of both polymer precursor moieties being connected by the sulfur containing segment include endo terminal unsaturations, then the resultant PIB-based polymer network will take form of formula (III). If one of the polyisobutylene chains of one polymer precursor moiety has an exo terminal unsaturation and one of the polyisobutylene chains of the second polymer precursor moiety has an endo terminal unsaturation, then the resultant PIB-based polymer network will take the form of formula (II). Finally, if the polyisobutylene chains of both polymer precursor moieties being connected by the sulfur containing segment include allyl terminal unsaturations, then the resultant PIB-based polymer network will take form of formula (IV).

In one or more embodiments, the at least one sulfur segment includes only one sulfur atom between any two polyisobutylene polymer chains from two different PIB polymer segments. In various embodiments requiring only one sulfur atom between any two polyisobutylene polymer chains from two different PIB polymer segments, the PIB-based polymer networks may have any of the formulas selected from:

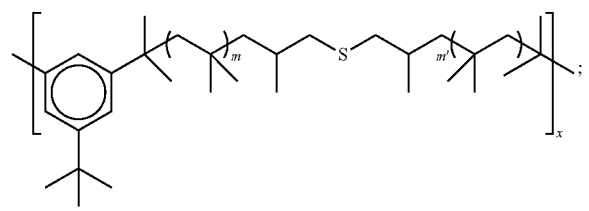
(V)

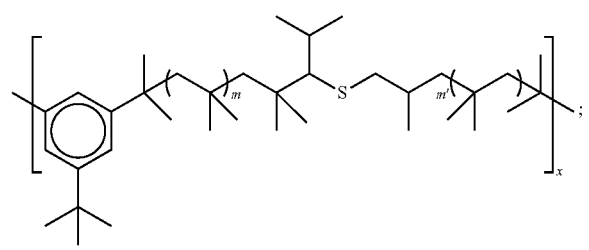
(VI)

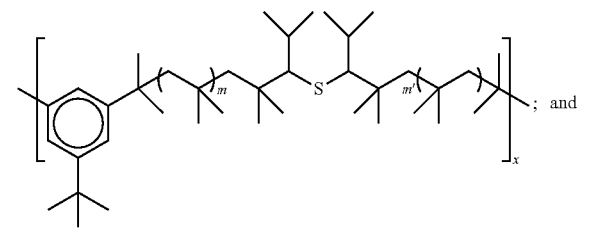
(VII)

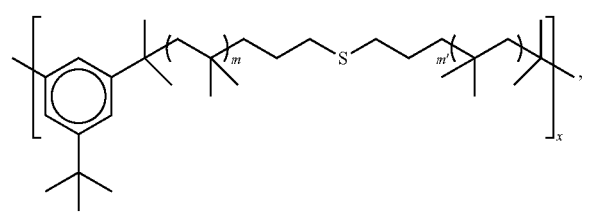
(VIII)

wherein m, m', and X are each an integer from 2 to 5,000. In some embodiments, X may be from 2 to 50,000. Again, It will be appreciated that the structures of the end groups of the polyisobutylene polymer precursor moieties being used will determine which formula structure the PIB-based polymer network will take. For example, if the polyisobutylene chains of both polymer precursor moieties being connected by the sulfur containing segment include exo terminal unsaturations, then the resultant PIB-based polymer network will take form of formula (V). If the polyisobutylene chains of both polymer precursor moieties being connected by the sulfur containing segment include endo terminal unsaturations, then the resultant PIB-based polymer network will take form of formula (VII). If one of the polyisobutylene chains of one polymer precursor moiety has an exo terminal unsaturation and one of the polyisobutylene chains of the second polymer precursor moiety has an endo terminal unsaturation, then the resultant PIB-based polymer network will take the form of formula (VI). And finally, if the polyisobutylene chains of both polymer precursor moieties being connected by the sulfur containing segment include allyl terminal unsaturations, then the resultant PIB-based polymer network will take form of formula (VIII).

Another aspect of the present invention provides a polyisobutylene-based polymer network including the thiol-ene reaction product of at least two polyisobutylene polymer precursor moieties, each polyisobutylene polymer precursor moiety having at least two end group selected from the end groups —$CH_2$—$C(CH_3)$=$CH_2$, —$CH$=$C(CH_3)_2$, and —$CH_2$—$CH$=$CH_2$; and at least one multi-functional thiol, in the presence of light or heat. In one or more embodiments, each polyisobutylene polymer precursor moiety may include a core and at least two polyisobutylene chains extending from the core. Each of the at least two polyisobutylene chains then have an end group selected from the end groups —$CH_2$—$C(CH_3)$=$CH_2$, —$CH$=$C(CH_3)_2$, and —$CH_2$—$CH$=$CH_2$. In any embodiments requiring a core, the core may be an initiator core. In any embodiments requiring a core, the core may be aryl or include an aromatic ring. In one or more embodiments above, the initiator core may be formed from dimethyl-5-tert-butyl-1,3-benzyl dicarboxylate.

In any embodiments requiring a linear polyisobutylene polymer having an extended length, the polyisobutylene-based polymer networks above may include each polyisobutylene polymer precursor moiety having only two polyisobutylene chains extending from the core, such that each polyisobutylene polymer precursor moiety is linear. Each thiol would preferably be bi-functional, such that the polymer network would provide a linear polyisobutylene polymer having an extended length. It will be appreciated that in such embodiments and in other embodiments, the linear polyisobutylene polymer will have a higher molecular weight than each of the polyisobutylene polymer precursor moieties.

In various embodiments including some of the embodiments above, the polyisobutylene-based polymer network may include, as one of its reactant products, a polyisobutylene polymer precursor moiety having a formula selected from:

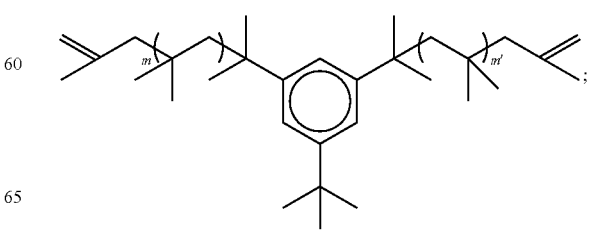
(IX)

(X)

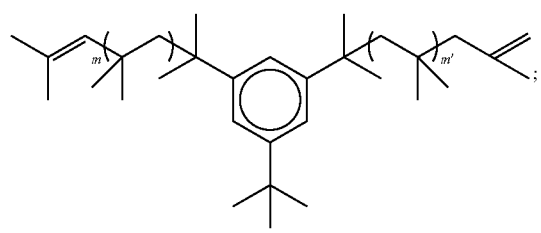

(XI)

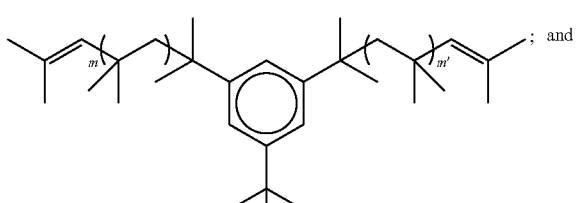
; and (XII)

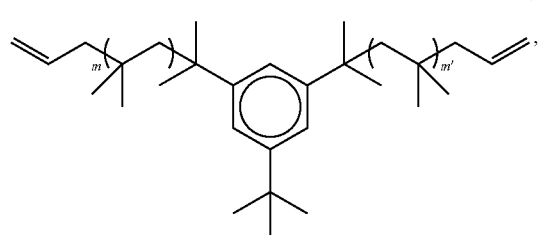
;

wherein m and m' are each an integer from 2 to 5,000. It will be appreciated that formula (IX) provides exo terminal unsaturated end groups, formula (X) provides one exo terminal unsatured end group and one endo terminal unsaturated end group, formula (XI) provides endo terminal unsaturated end groups, and formula (XII) provides allyl terminal unsaturated end groups.

In one or more embodiments, including some embodiments above, each polyisobutylene polymer precursor moiety may include at least three polyisobutylene chains extending from a core, wherein each of the at least three polyisobutylene chains have an end group selected from the groups $-CH_2-C(CH_3)=CH_2$, $-CH=C(CH_3)_2$, and $-CH_2-CH=CH_2$. It will be appreciated that where three polyisobutylene chains extend from the core, each polyisobutylene polymer precursor moiety may have a formula selected from:

(XIII)

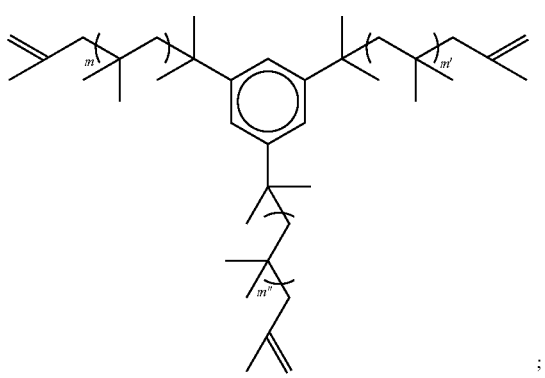
;

(XIV)

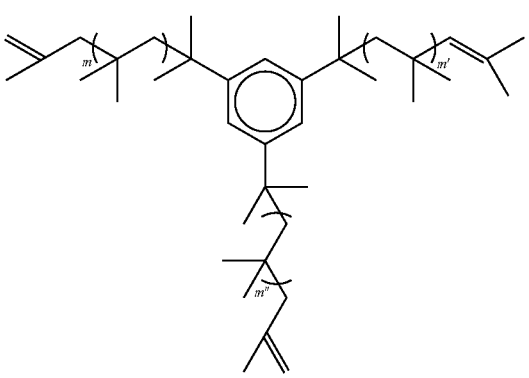
;

(XV)

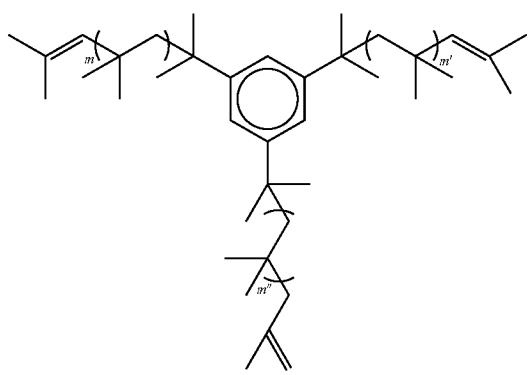
;

(XVI)

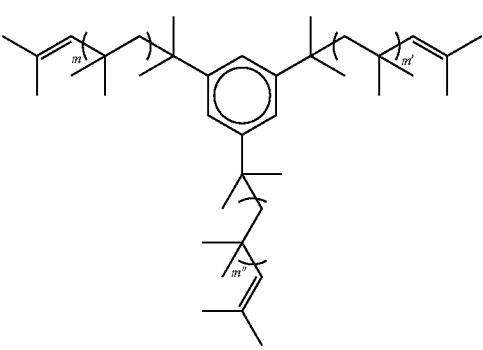
; and (XVII)

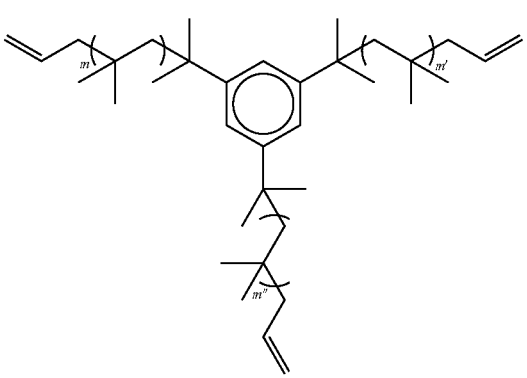
, wherein m, m' and m" are each one an integer from 2 to 5,000. It will be appreciated that formula (XIII) provides three exo terminal unsaturated end groups, formula (XIV) provides two exo terminal unsaturated end groups and one endo terminal unsaturated end group, formula (XV) provides one exo terminal unsaturated end group and two endo terminal unsaturated end groups, formula (XVI) provides three endo terminal unsaturated end groups, and formula (XVII) provides three allyl terminal unsaturated end groups.

In one or more embodiments, including some of the embodiments above, each multi-functional thiol may be bi-functional. One such bi-functional thiol, as defined for this invention, is hydrogen sulfide, H—S—H. It will be appreciated that the use of H—S—H will result in only one sulfur atom between the polymer chains of any two different polyisobutylene polymer segments, when reacted. In other embodiments required two sulfur atoms, another bi-fuctional thiol has the formula:

(XVIII)

wherein n is an integer from 1 to 12.

In other embodiments including some of the other embodiments above, each multi-functional thiols be may tri-functional. In other embodiments, each of the multi-functional thiols is tetra-functional. In various embodiments of the present invention, the at least one multi-functional thiol may be selected from the formulas:

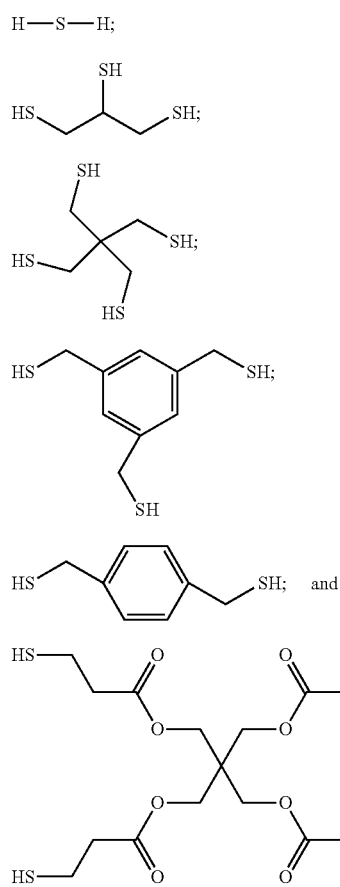

Still another aspect of the present invention provides a method for creating a PIB-based polymer network, the method including the first step of providing at least two polyisobutylene polymer precursor moieties, each polyisobutylene polymer precursor moiety having at least two end groups selected from the end groups —CH$_2$—C(CH$_3$) =CH$_2$, —CH=C(CH$_3$)$_2$, and —CH$_2$—CH=CH$_2$. Next, at least one multi-functional thiol is added to the at least two polyisobutylene polymer precursor moieties to form a mixture. Then, the mixture is irradiated with light or heat, so as to provide a thiol-ene reaction, thereby producing the PIB-based polymer network.

In one or more embodiments, each polyisobutylene polymer precursor moiety comprises an initiator core and at least two polyisobutylene chains extending from the initiator core, wherein each of the at least two polyisobutylene chains have an end group selected from the end groups —CH$_2$—C(CH$_3$) =CH$_2$, —CH=C(CH$_3$)$_2$, and —CH$_2$—CH=CH$_2$. In various embodiments, each polyisobutylene polymer precursor moiety may have a formula selected from:

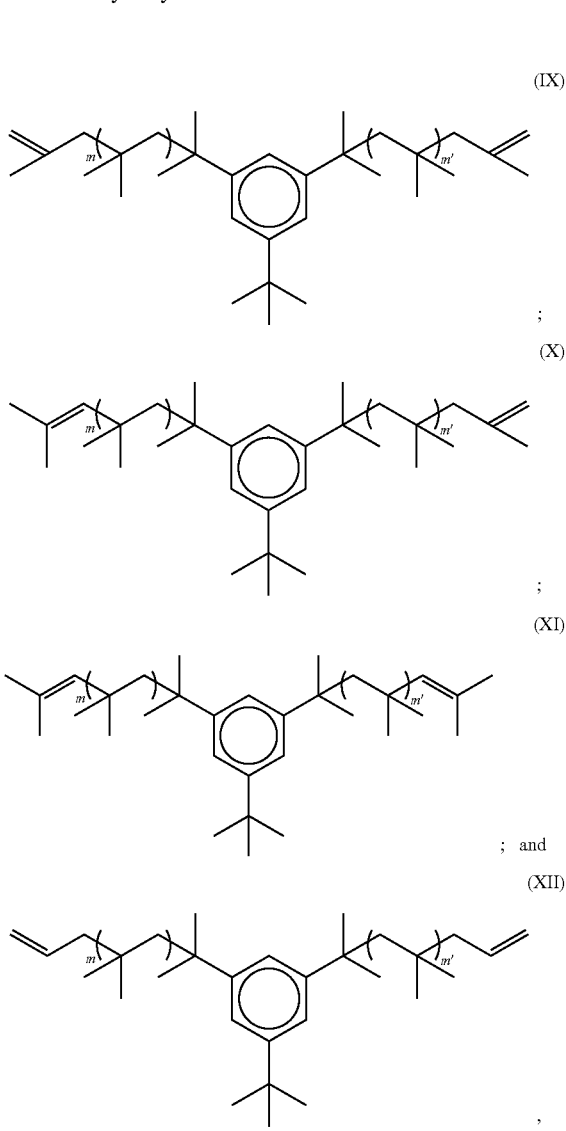

wherein m and m' are each an integer from 2 to 5,000. In other embodiments, each polyisobutylene polymer precursor moiety may have a formula selected from:

(XIII)

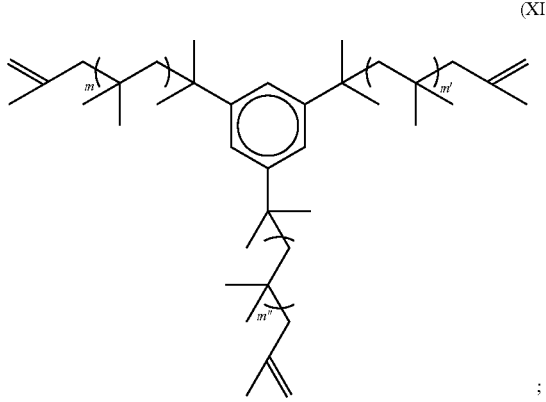

;

(XIV)

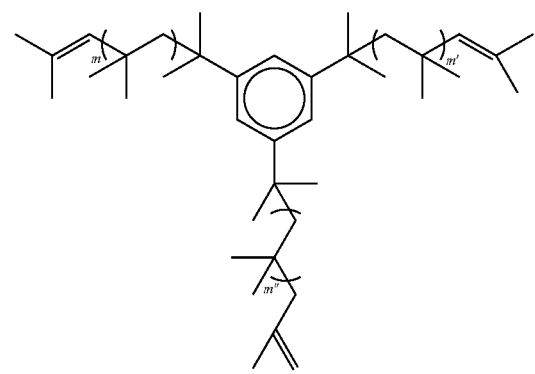

;

(XV)

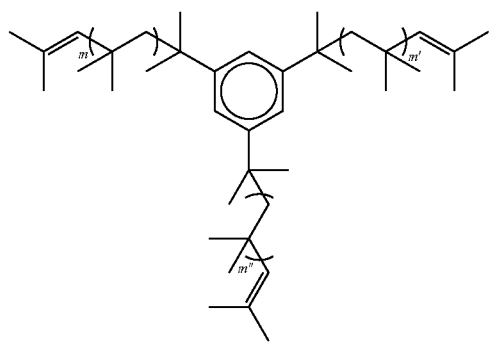

;

(XVI)

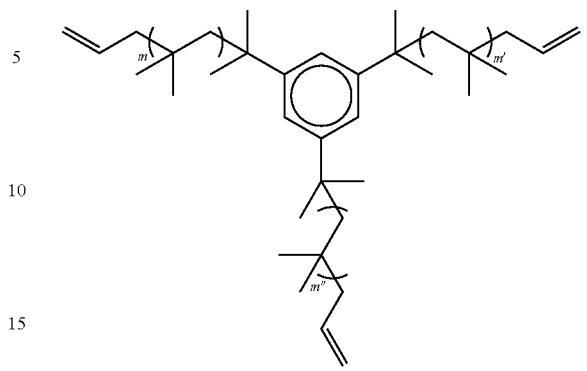 ; and (XVII)

wherein m, m' and m" are each one an integer from 2 to 5,000.

In the same or other embodiments, the at least one multi-functional thiol may be selected from the formulas:

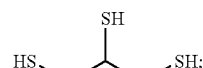 (XIX)

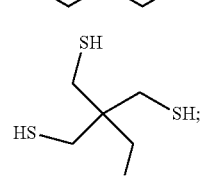 (XX)

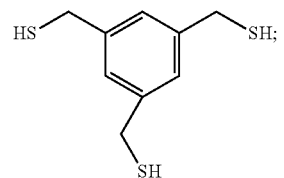 (XXI)

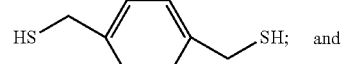 (XXII)

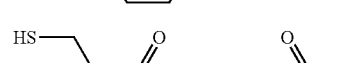 and (XXIII)

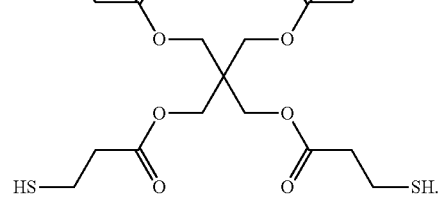 (XXIV)

In some embodiments, the step of irradiating includes heating the mixture in the presence of a free radical initiator to produce the polymer network.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
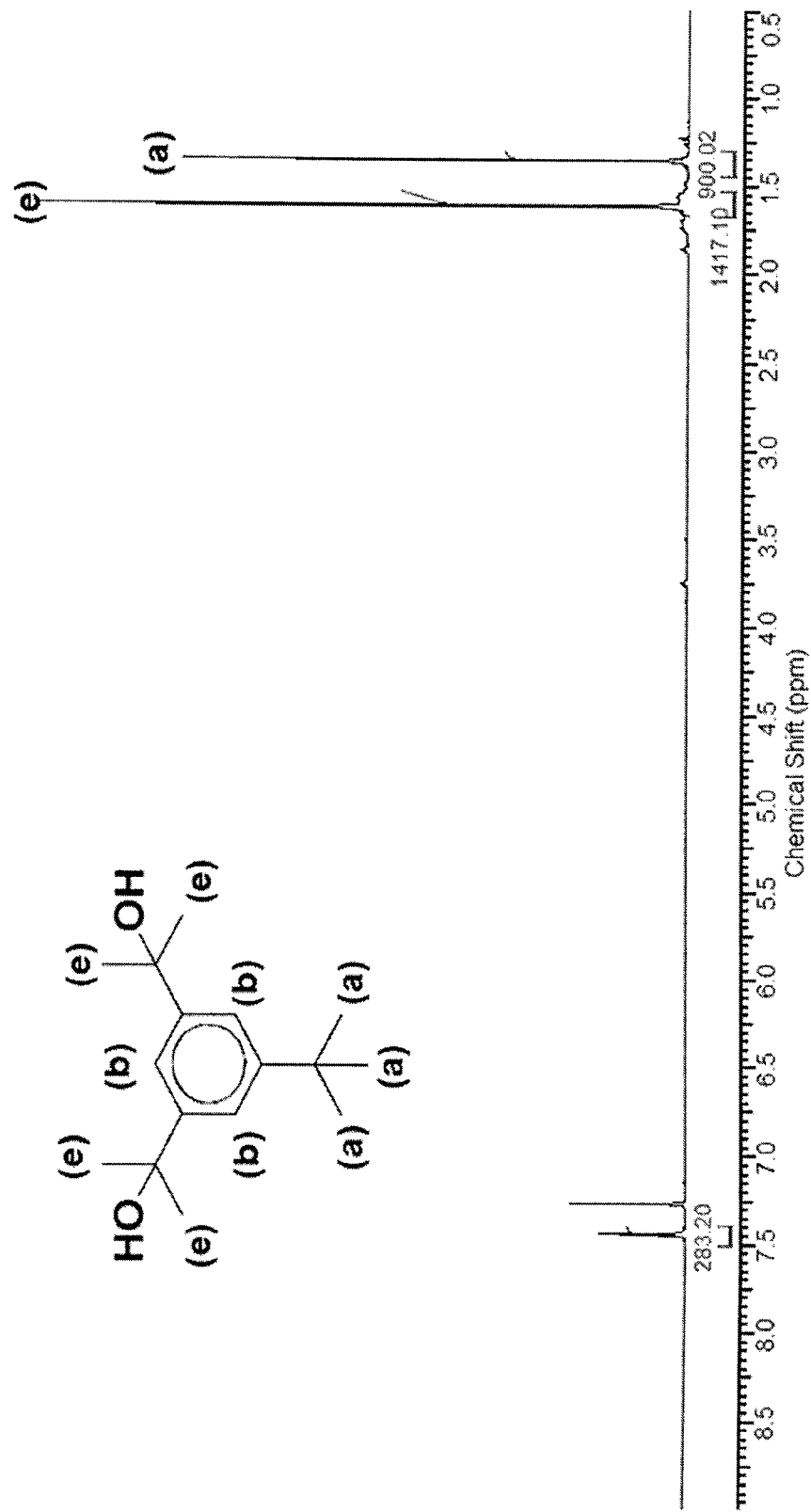
FIG. 1 is a $^1$H NMR spectrum of 5-tert-Butyl-1,3-dicumylalcohol.

It has been found that the thiol-ene click reaction can be readily employed for the preparation of high molecular weight linear rubbery polyisobutylenes (PIBs) from lower molecular weight liquid PIB precursors ("liquid rubber technology"). In general outline, these high molecular weight linear rubbery PIBs may be formed by contacting lower molecular weight polyisobutylenes carrying exo or endo or allyl terminal unsaturations (U-PIB-U) with bi- and/or multifunctional thiols, and then UV irradiating or heating the mixtures. The same thiol-ene reaction can also be used for the preparation of PIB networks, useful for making corrosion resistant coatings for metal surfaces and water-repellent wound dressings on living skin.

As used herein, U-PIB-U refers to a multi-functional or, more specifically in some embodiments, a bi-functional PIB polymer precursor moiety having two end groups (U) that carry exo, endo, or allyl terminal unsaturations. The PIB portion of the U-PIB-U moiety may comprise from about 2 to about 5,000 isobutylene repeating units. In some embodiments, the U-PIB-U moiety may comprise from about 3 to about 4,000 isobutylene repeating units. In other embodiments, the U-PIB-U moiety may comprise from about 5 to about 1,000 isobutylene repeating units. In still other embodiments, the U-PIB-U moiety may have sufficient isobutylene repeating units to provide a molecular weight for the U-PIB-U moiety of at least 100 g/mol; in other embodiments, at least 1000 g/mol; and in still other embodiments at least 2000 g/mol.

In some embodiments, the U-PIB-U moiety may comprise a core or, more specifically, an initiator core from which two polyisobutylene chains having an exo, endo, or allyl terminal unsaturation extend. In some embodiments, the initiator core may be a residue of a bi-functional initiator used to form the U-PIB-U, including, without limitation, 5-tert-butyl-1,3-(2-methoxy-2propyl)benzene (TBDMPB).

As used herein, the terms "exo terminal unsaturation," "exo unsaturation," "exo end group," "exo group," "exo olefin termini," and "vinylidene group," are used interchangeably and refer to an end group having the formula —CH$_2$—C(CH$_3$)=CH$_2$ and may be abbreviated as -V. And, as used herein, the terms the terms "endo terminal unsaturation," "endo end group," "endo group," "endo unsaturation," and "endo olefin termini" are used interchangeably and refer to an end group having the formula —CH=C(CH$_3$)$_2$ and may be abbreviated as -E. These unsaturated -V and -E end groups arise because of ever-present chain transfer reactions in isobutylene polymerizations. In most conventional (non-living) isobutylene polymerizations typically about 70% exo and 30% endo end groups form, and this ratio is rather insensitive to changes in reaction parameters, e.g., solvent, temperature, reagent concentrations.

U-PIB-U polymers, where U is an exo or endo saturation ("V/E-PIB-V/E polymer mixtures" or "V/E-PIB-V/E mixtures") can be prepared by any method known in the art for that purpose. In some embodiments, these V/E-PIB-V/E mixtures may be synthesized by initiating the polymerization of isobutylene with a difunctional initiator (dimethyl-5-tert-butyl-1,3-benzyl dicarboxylate, (DMTBBDC)) and converting the tert-chlorine end groups of the PIB formed by quantitative chain end dehydrochlorination (e.g, with tBuOK).

The following set of equations (Scheme 1) shows these transformations and the structure of V/E-PIB-V/E (see last three formulae) so formed:

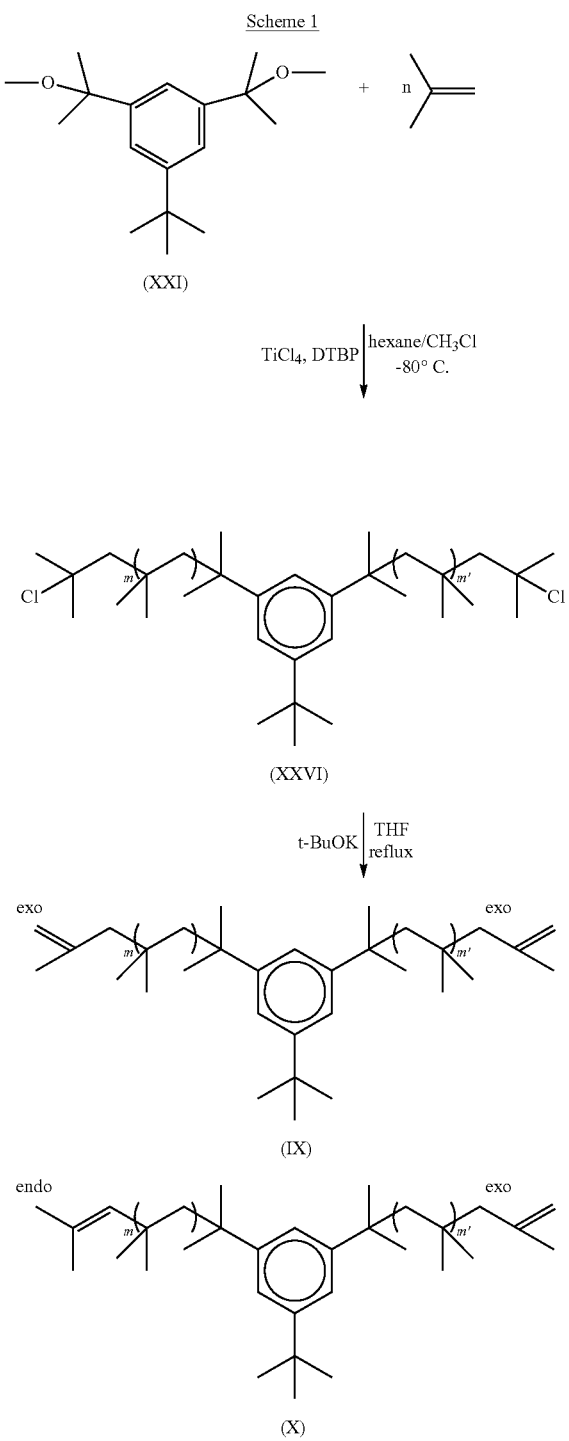

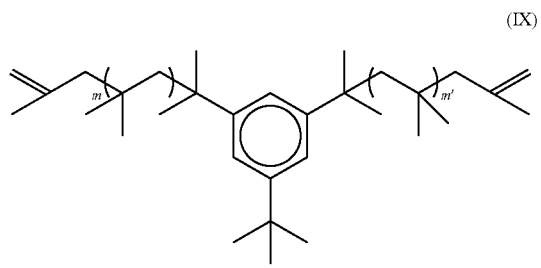

(IX)

wherein m and m' are each an integer from 2 to 5,000 or other ranges as noted above.

In some embodiments, the U-PIB-U polymer may have the formula:

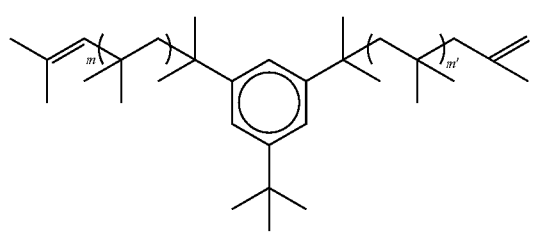

(X)

wherein m and m' are each an integer from 2 to 5,000, or other ranges as noted above.

In some embodiments, the U-PIB-U polymer may have the formula:

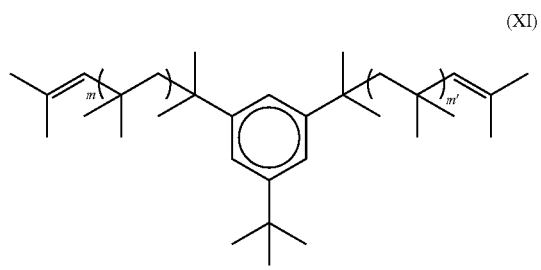

(XI)

As used herein, an "allyl end group" refers to an end group having the formula —CH$_2$—CH═CH$_2$ and may be abbreviated as A. U-PIB-U, where U=an allyl end group (A-PIB-A), can be readily prepared by any method known in the art for that purpose. In some embodiments, A-PIB-A polymers may be made as set forth in Example 3, below.

In some embodiments, the U-PIB-U polymer may have the formula:

wherein m and m' are each an integer from 2 to 5,000, or other ranges as noted above.

In some embodiments, the U-PIB-U polymer may have the formula:

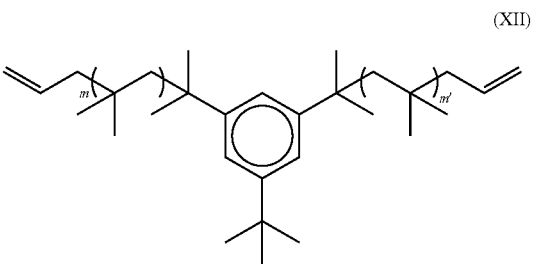

(XII)

wherein n and n' are each an integer from 2 to 5,000, or other ranges as noted above.

In one aspect, present invention is directed to higher molecular weight PIBs prepared by linking the relatively low molecular weight U-PIB-U polymers discussed above using multi-functional thiols via thiol-ene "click" reactions and methods of making them. In these embodiments, U-PIB-U polymers are reacted with a bi-functional thiol and either irradiated with ultra violet light in the presence of a catalyst or heated in the presence of a radical initiator. In these reactions, the unsaturated end groups of the U-PIB-U polymer chains react with the thiol end groups of the bi-functional thiols, thereby linking the U-PIB-U polymer chains together to form a higher molecular weight PIB-based polymer network. It is believed that the sulfur atom(s) in each of the thiol end groups reacts with an unsaturated end group of a U-PIB-U using a thiol-ene "click" reaction to link each end of the U-PIB-U to one end of the bifunctional thiol by a sulfur-carbon bond.

Any multi-functional thiol may be used, but is typically limited to those having 12 or less carbon atoms. While not technically a thiol, hydrogen sulfide (H$_2$S) is bi-functional in that it can bond to two alkene end group via thiol-ene "click" reactions and for that reason is treated herein as if it were a multi-functional or, more specifically, a bi-functional thiol. As used herein, the terms "bi-functional thiol(s)," "bifunctional thiol(s)" "di-thiol(s)" and "di-functional thiol(s)," are used interchangeably and refer to hydrogen sulfide (H$_2$S) or any aromatic or aliphatic compound having two thiol groups available for bonding with an alkene end group via a thiol-ene "click" reaction. In some embodiments, the bi-functional thiol is linear. As used herein, the terms "thiol group," "thiol end group," "mercapto," and/or "mercapto group," are used interchangeably to refer to an end group having the formula —SH. In some embodiments, the multi-functional thiol is a linear hydrocarbon having from 1 to 12 carbon atoms and two thiol end groups. In other embodiments, the thiol may have from 2 to 6 carbon atoms. Suitable bi-functional thiols include, without limitation, hydrogen sulfide, 1,4-benzenedimethanethiol (BDMTh), 1,2-ethanedithiol and combinations thereof.

In some embodiments, the bi-functional thiol has the formula:

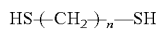  (XVIII)

wherein n is an integer from 1 to 12. In some embodiments, n may be an integer from 1 to 6. In some embodiments, n may be an integer from 1 to 4.

In some embodiments, the bi-functional thiol has the formula:

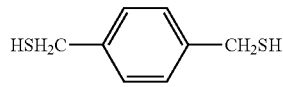  (XXIII)

As will be appreciated by those of skill in the art, the thiol-ene "click" reactions used herein may be initiated in at least two ways. In some embodiments, a photochemical reaction is used. In these embodiments, a suitable catalyst is added to the U-PIB-U and bi-functional thiol and the solution is irradiated with ultraviolet light to initiate the reaction. Any catalyst known in the art for use with UV light-activated thiol-ene reactions may be used and one of ordinary skill in the art will be able to select a suitable catalyst without undue experimentation. In some embodiments, the catalyst is 2,2-dimethoxy-2-phenyl acetophenone (DMPA).

Next the solution is irradiated with ultraviolet (UV) light to activate the thiol-ene reaction. In some embodiments, the solution may be irradiated with UV light using a medium pressure Hg lamp as the UV source. The exact reaction parameters will depend upon the particular materials being reacted and is well within the ability of one of ordinary skill in the art to determine without undue experimentation. In some embodiments, solution may be irradiated with UV light using a medium pressure Hg lamp for 60 min at from about 0° C. to about 5° C. to complete the reaction. Alternatively, a radical initiator is added to the U-PIB-U and bi-functional thiol and the solution is heated to initiate the reaction. Any radical initiator known in the art for use with UV light-activated thiol-ene reactions may be used and one of ordinary skill in the art will be able to select a suitable radical initiator without undue experimentation. The exact reaction parameters will depend upon the particular materials being reacted and is well within the ability of one of ordinary skill in the art to determine without undue experimentation. In some embodiments, the solution may be heated to initiate the reaction.

By way of example, the Scheme 2, below, shows the structures of the starting materials and the products obtained when V/E-PIB-V/E mixtures are mixed with dithiols containing aromatic or aliphatic groups, such as 1,4-benzenedimethanethiol (BDMTh) and 1,2-ethanedithiol (EDTh), and exposed to UV radiation (or heat in the presence of a radical initiator) according to at least one embodiment of the present invention.

Scheme 2

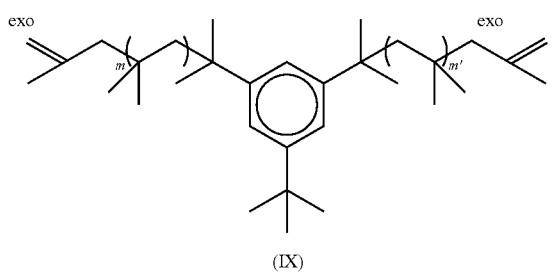

(IX)

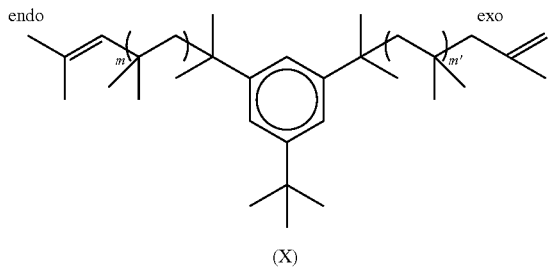

(X)

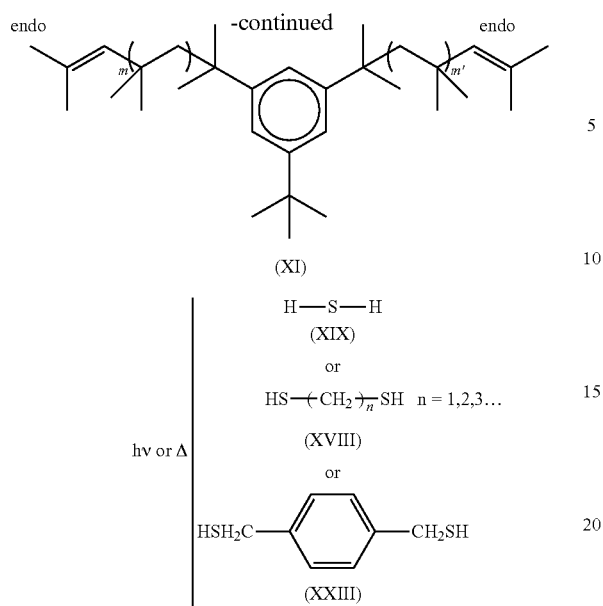

(XI)

H—S—H
(XIX)

or

HS—(CH$_2$)$_n$—SH  n = 1,2,3...
(XVIII)

or

HSH$_2$C—⟨benzene⟩—CH$_2$SH
(XXIII)

hν or Δ

In some embodiments, the procedure set forth above for V/E-PIB-V/E mixtures may be carried out to link U-PIB-U molecules, where U is an allyl end group.

In some embodiments, the linked U-PIB-U molecules of the present invention have the formula:

wherein m, m', and X are each an integer from 2 to 5,000 and n is an integer from 1 to 12. In some embodiments, X may be from 2 to 50,000.

In some embodiments, the linked U-PIB-U molecules of the present invention have the formula:

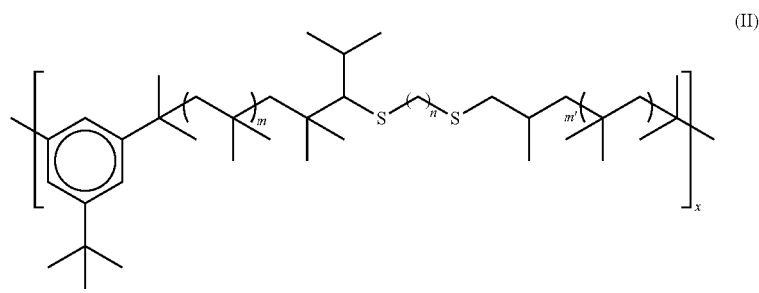

(II)

wherein m, m', and X are each an integer from 2 to 5,000 and n is an integer from 1 to 12.

In some embodiments, the linked U-PIB-U molecules of the present invention have the formula:

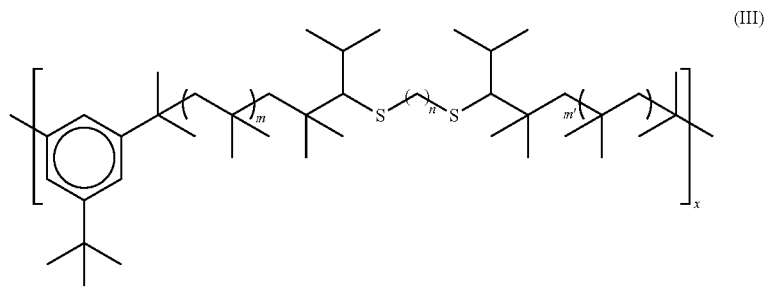

(III)

wherein m, m', and X are each an integer from 2 to 5,000 and n is an integer from 1 to 12. In some embodiments, X may be from 2 to 50,000.

In some embodiments, the linked U-PIB-U molecules of the present invention have the formula:

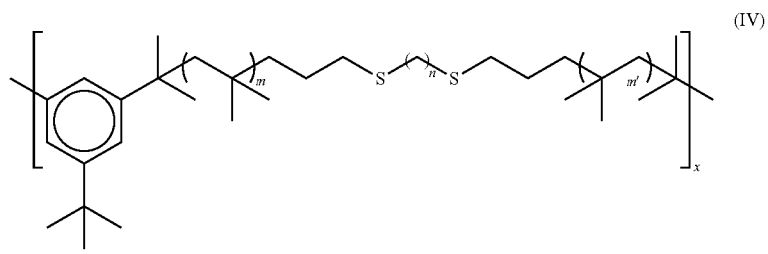

(IV)

wherein m, m', and X are each an integer from 2 to 5,000 and n is an integer from 1 to 12. In some embodiments, X may be from 2 to 50,000.

The thiol-ene click reaction can also affected using H—S—H as the bi-functional thiol in which case the extended PIB contains —S— connecting bonds:

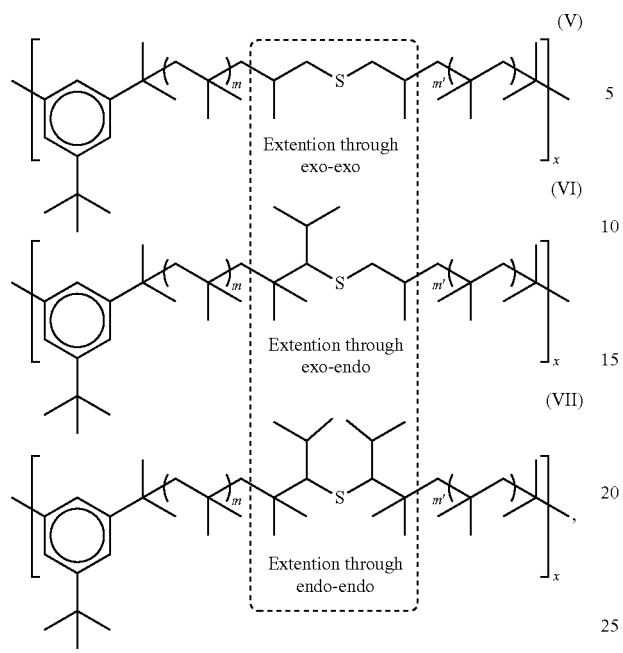

(V) Extention through exo-exo
(VI) Extention through exo-endo
(VII) Extention through endo-endo In these embodiments, wherein m, m', and X are each an integer from 2 to 5,000. In some embodiments, X may be from 2 to 50,000.

In some embodiments, the linked U-PIB-U molecules of the present invention have the formula:

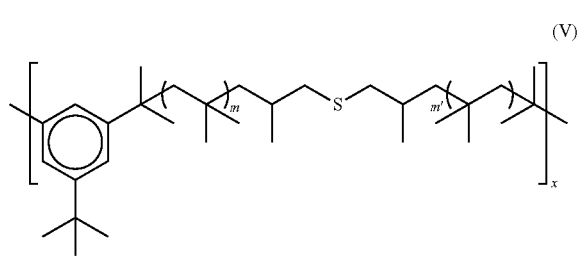

(V)

wherein m, m', and x are each an integer from 2 to 5,000. In some embodiments, X may be from 2 to 50,000.

In some embodiments, the linked U-PIB-U molecules of the present invention have the formula:

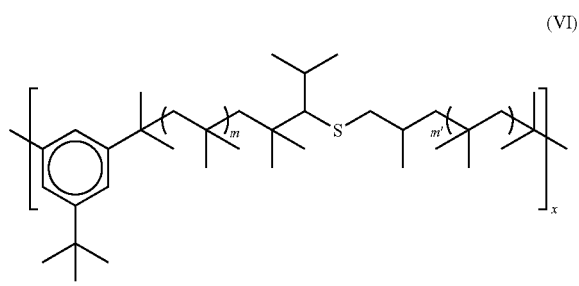

(VI)

wherein m, m', and X are each an integer from 2 to 5,000. In some embodiments, X may be from 2 to 50,000.

In some embodiments, the linked U-PIB-U molecules of the present invention have the formula:

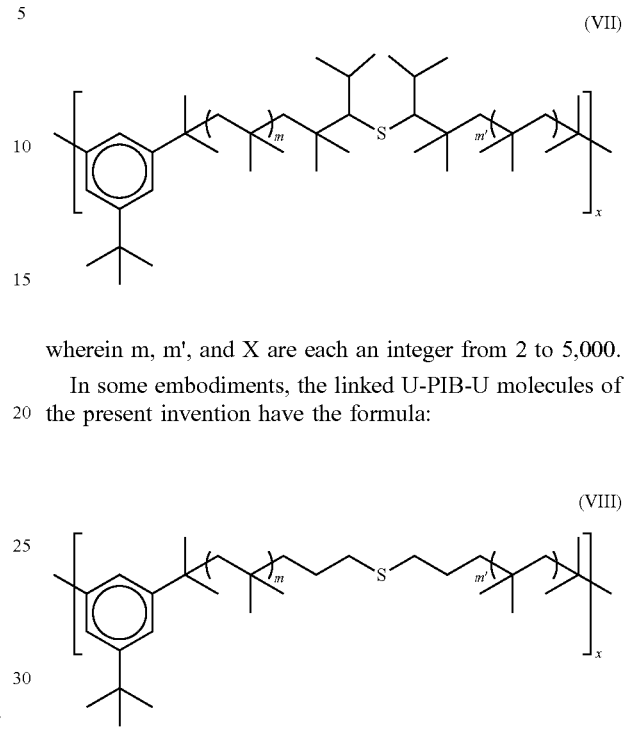

(VII)

wherein m, m', and X are each an integer from 2 to 5,000.

In some embodiments, the linked U-PIB-U molecules of the present invention have the formula:

(VIII)

wherein m, m', and X are each an integer from 2 to 5,000. In some embodiments, X may be from 2 to 50,000.

In another aspect, the present invention is directed to PIB networks made by linking these U-PIB-U polymer precursor moieties with multi-functional thiols via the same thiol-ene "click" reactions discussed above. As used herein, the term "multi-functional thiol" refers to any aromatic or aliphatic multi-functional thiol having 2, 3 or more thiol end groups capable of reacting and bonding with an unsaturated end group of U-PIB-U polymer precursor moieties. Suitable tri-functional and tetra-functional thiols may include, without limitation, 1,3,5-benzenetrimethanethiol (BTMTh) and 2,2-bis(mercaptomethyl)-1,3-propanedithiol (BMMPTh).

Scheme 3, below, shows the formation and structures of PIB-based networks obtained when a U-PIB-U polymer mixture having exo and/or endo unsaturated end groups (V/E-PIB-V/E) are contacted with a multi-functional thiol containing aromatic or aliphatic groups, such as 1,3,5-benzenetrimethanethiol (BTMTh) and 2,2-bis(mercaptomethyl)-1,3-propanedithiol (BMMPTh), and the mixture is either exposed to UV light (in the presence of a catalyst) or heated (in the presence of a radical initiator). In particular, Scheme 3 shows the structure of a PIB network formed with a V/E-PIB-V/E polymer mixture and a tetra-functional thiol Scheme 3

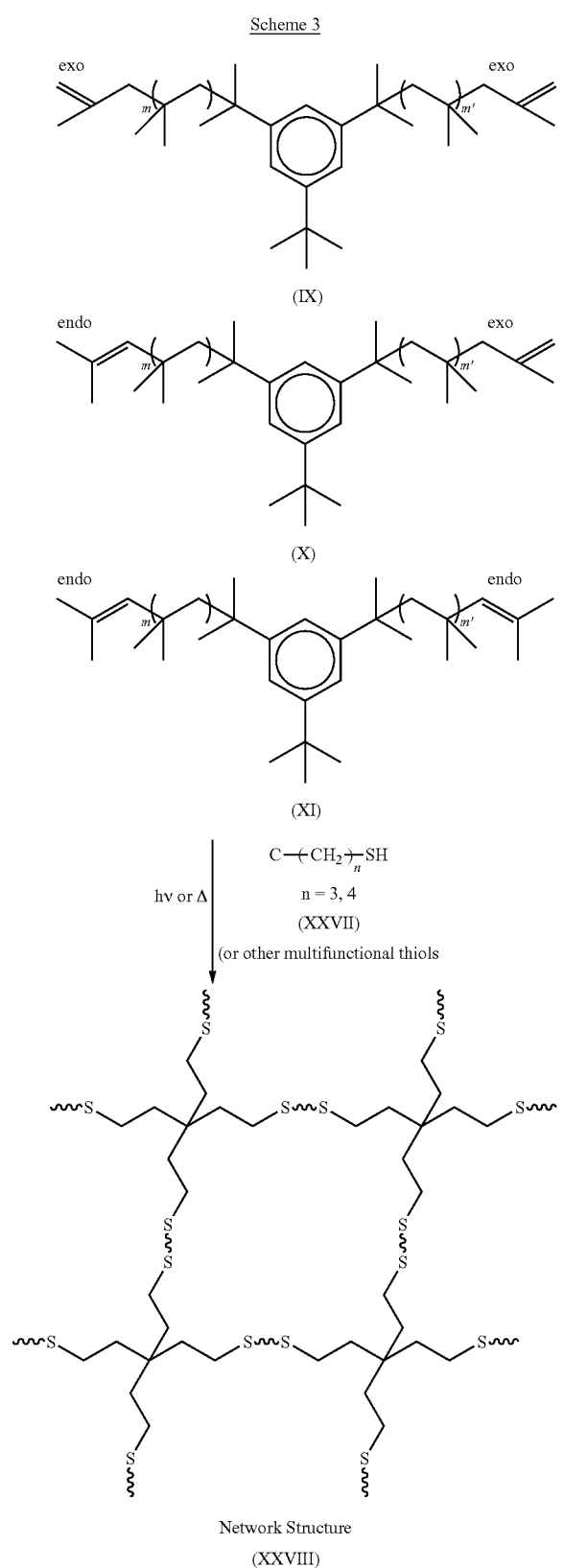

Network Structure
(XXVIII)

has allyl end groups rather than the V/E end groups of the V/E-PIB-V/E polymer mixture shown. It is believed that these structures are new compositions.

In another aspect, the present invention is directed to PIB networks made by linking multi-arm (here, three-arm) star-PIB-U polymer precursor moieties with multi-functional thiols via the same thiol-ene "click" reactions discussed above and to methods of making them. PIB networks can be prepared using the same thiol-ene chemistry outline above with multi-arm star PIBs having exo or endo or allyl end groups as starting materials, rather than the bi-functional U-PIB-U used above. These polymers can be obtained by well known procedures and one of ordinary skill in the art will be able to synthesize them without undue experimentation. In some embodiments, three arm star PIBs having exo or endo or allyl end groups may be made by any method known in the art for that purpose, including, but not limited to, those methods set forth in Examples 1 through 3. Examples of these three-arm polymer precursor moieties include the following formulas selected from:

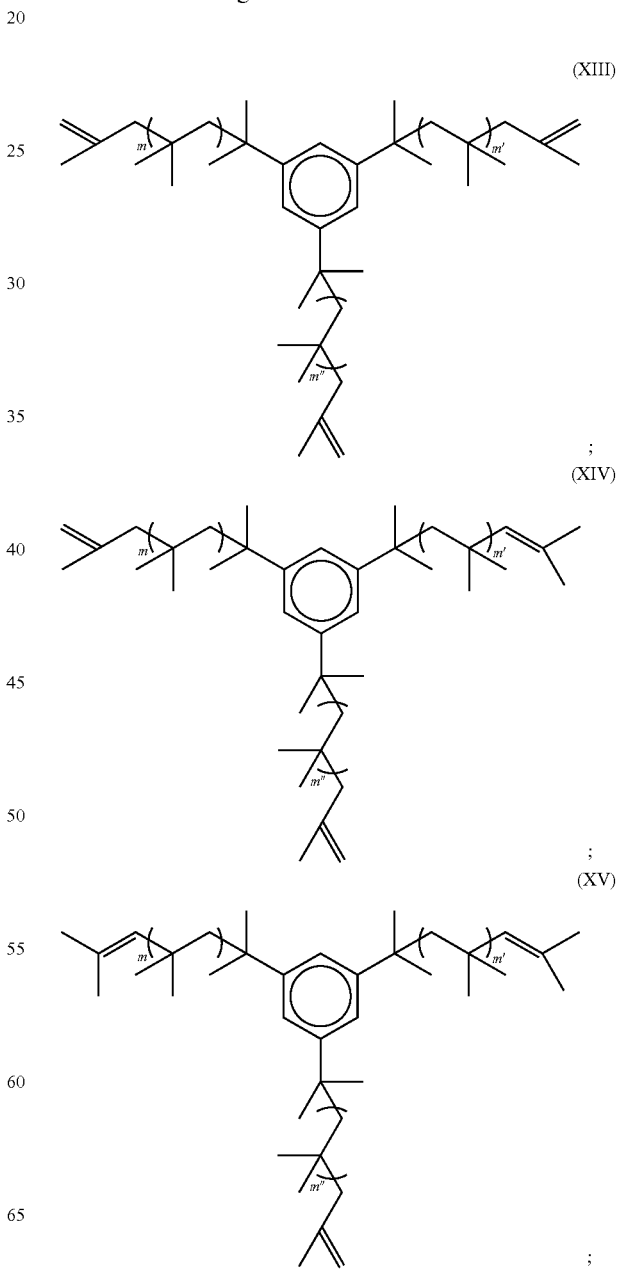

As should be apparent to those of skill in the art, the reaction shown in Scheme 3 can also be carried out and a comparable network formed, where the U-PIB-U polymer (XVI)

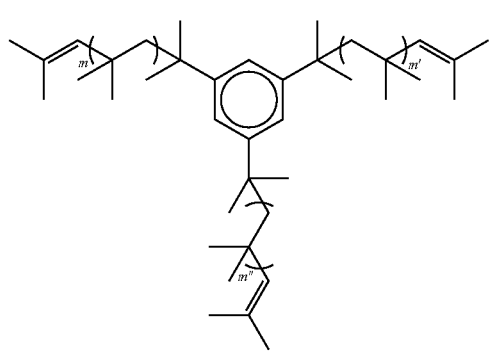

; and (XVII)

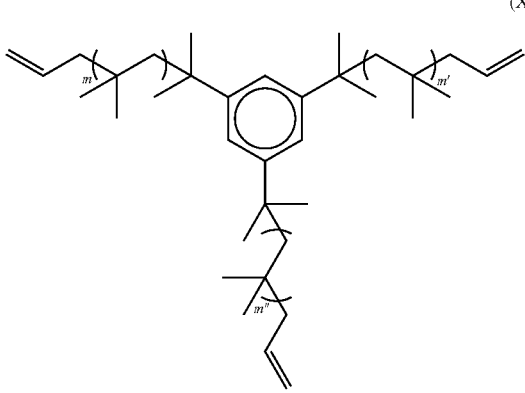

, wherein m, m' and m" are each one an integer from 2 to 5,000.

In these embodiments, hydrogen sulfide (H—S—H) and/or any aromatic or aliphatic multi-functional thiol having 2 or more thiol end groups capable of reacting and bonding with an unsaturated end group of the multi-arm PIB polymer precursor moieties may be used as the multi-functional thiol for the reaction. Suitable bi-functional and/or multi-functional thiols may include, without limitation, 1,2,3-propanetrithiol, 1,3,5-benzenetrimethanethiol (BTMTh) and 2,2-bis(mercaptomethyl)-1,3-propanedithiol (BMMPTh), 1,4-benzenedimethane thiol, three mercapto-propionate, and combinations thereof. Representative multifunctional thiols that can be used for extension and/or crosslinking include the following:

H—S—H (XIX)
hydrogen sufide

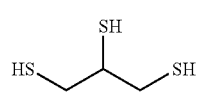
1,2,3-Propanetrithiol
(XX)

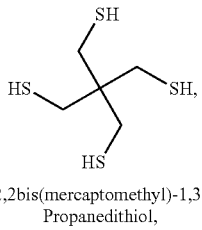
2,2bis(mercaptomethyl)-1,3-Propanedithiol,
(XXI)

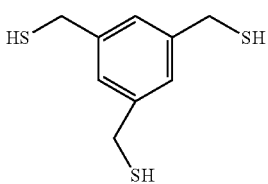
1,3,5-Benzenetrimethanethiol
(XXII)

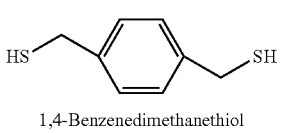
1,4-Benzenedimethanethiol
(XXIII)

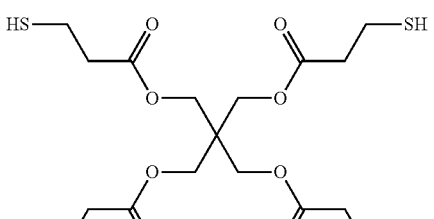
3-mercapto-propionate
(XXIV)

Scheme 4 shows the formation and structures of representative PIB-based networks obtained when three arm star-PIB-U polymer precursor moieties are reacted with bi or multi-functional thiols via the same thiol-ene "click" reactions discussed above.

Scheme 4

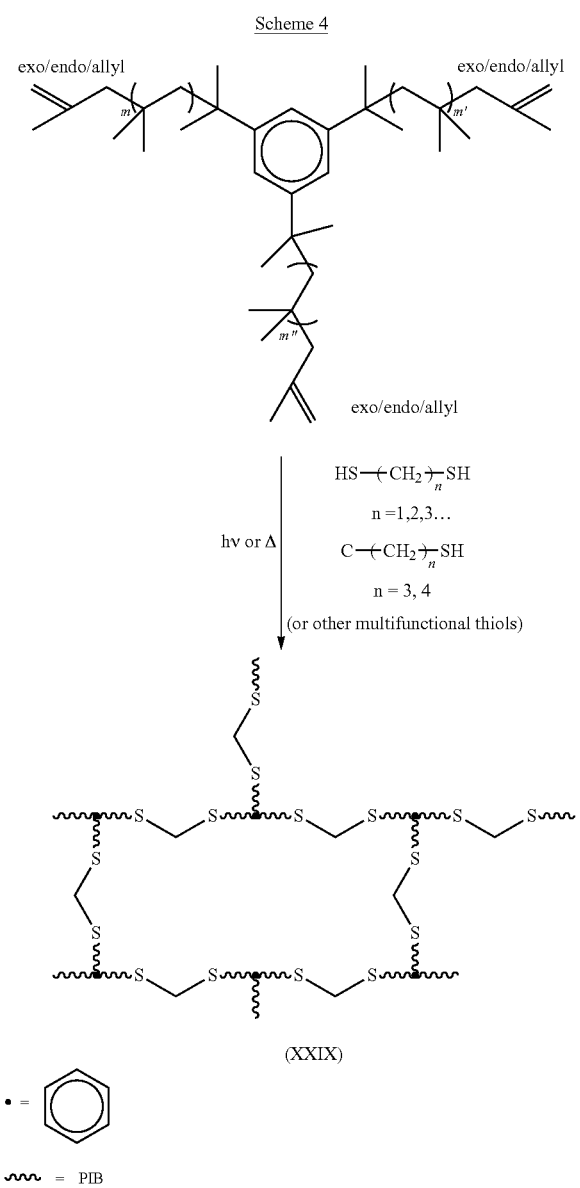

While Scheme 4 shows only the exo terminus and a bi-functional thiol, it should be appreciated that endo and allyl end groups and multi-functional thiols may also be used in at least some embodiments of the present invention.

These networks are useful for corrosion protection of metal and other surfaces. Water-repellent protective coatings can be prepared by covering surfaces by spraying or coating with neat mixtures of U-PIB-U (or the multi-arm star PIBs discussed above) plus a bi- or multi-functional thiol, and UV irradiating the system with a UV source (lamp), or heating the system in the presence of a free radical initiator. In a similar manner, living skin can also be coated and protected.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Synthesis of the Difunctional Initiator

As shown in Scheme 5 below, the synthesis of the bi-functional initiator 5-tert-butyl-1,3-(2-methoxy-2propyl)benzene (TBDMPB) was undertaken in three steps.

Scheme 5

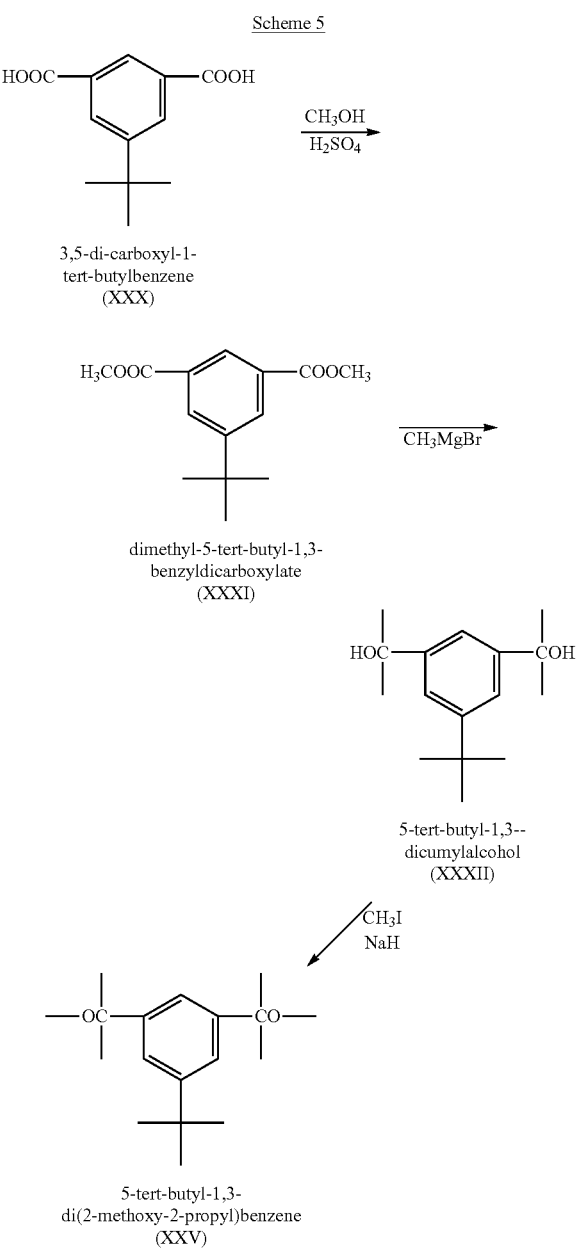

Figure 3:
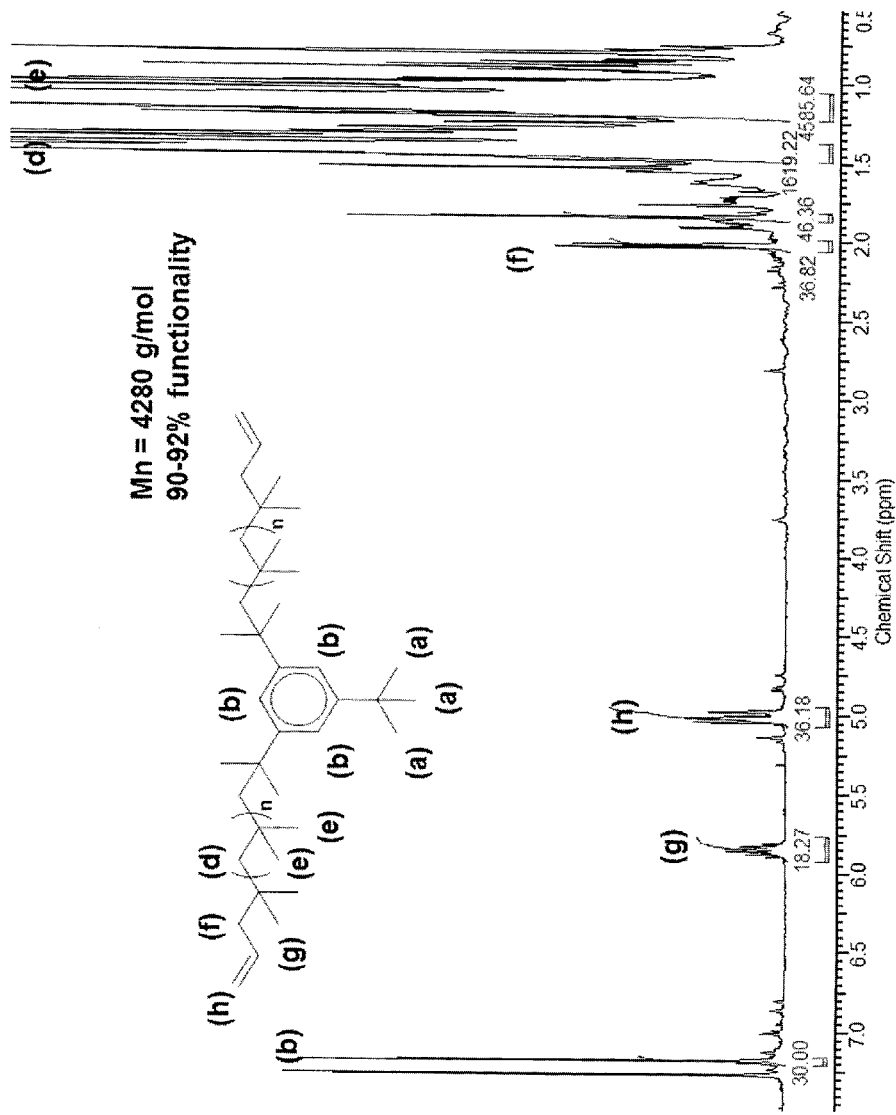
FIG. 3 is a $^1$H NMR spectrum of A-PIB-A.

The first step was the synthesis of dimethyl-5-tert-butyl-1,3-benzyl dicarboxylate (XXXI). Thus, 3,5-di-carboxyl-1-tert-butylbenzene (35.52 g, 0.16 moles) was esterified by refluxing for 48 h in CH$_3$OH (700 ml, 17.5 mL) in the presence of concentrated H$_2$SO$_4$ (68 mL). The mixture was cooled to room temperature, stored at 0° C. overnight, the solid was filtered and washed with water until the filtrate was acid free. The wet solid was freeze dried, dissolved in 200 mL THF, dried over MgSO$_4$ overnight, and filtered. The solvent was evaporated and the product was recovered. Conversion was 97%. $^1$H NMR spectroscopy (FIG. 3) showed resonances of the methyl protons of the tert-butyl group (1.28 ppm), the methyl protons of the ester groups (3.9 ppm), and the aromatic protons (8.20-8.50 ppm).

In the second step, 5-tert-butyl-1,3-dicumyl alcohol (TB-DCA) (XXXII) was prepared by combining 10 g (0.04 moles) of the DMTBBDC (obtained in the first step, above) and methyl magnesium bromide (0.2 moles, 70 mL, 2.8 M) dissolved in 100 mL anhydrous THF, at 0° C. under dry N$_2$ atmosphere. The reaction product was extracted by diethyl ether, the ether phase was dried over MgSO$_4$, and the solvent was evaporated. The yield of 5-tert-butyl-1,3-dicumyl alcohol (TBDCA) (XXXII) was greater than 95%.

$^1$H NMR spectroscopy (FIG. 1) showed resonances at 1.25, 1.45, and 7.1-7.25 ppm characteristic of the methyl protons of the t-butyl group, the methyl protons of isopropyl groups and the aromatic protons, respectively.

The third and final step in the synthesis of the difunctional initiator (XXV) was the conversion of the 5-tert-butyl-1,3-dicumyl alcohol (XXXII) to the corresponding methyl ether, 5-tert-butyl-1,3-(2-methoxy-2propyl)benzene (TBDMPB) (XXV). Thus, NaH (0.155 moles, 3.71 g) was dispersed in 50 mL dry THF and TBDCA (10 g, 0.04 moles) dissolved in 35 mL of dry THF was added dropwise at 0° C. The reaction temperature was increased to 25° C. and the solution was stirred for 30 min. Methyl Iodide (MeI) (14.64 mL, 0.235 moles) was then added dropwise for 60 min at 0° C. The reaction was allowed to proceed overnight after which time 30 mL pentane was added to precipitate any polymer that formed during the reaction. The clear solution was separated by vacuum filtration and the solvent was evaporated under reduced pressure to isolate the product. Conversion was 98%.

Figure 2:
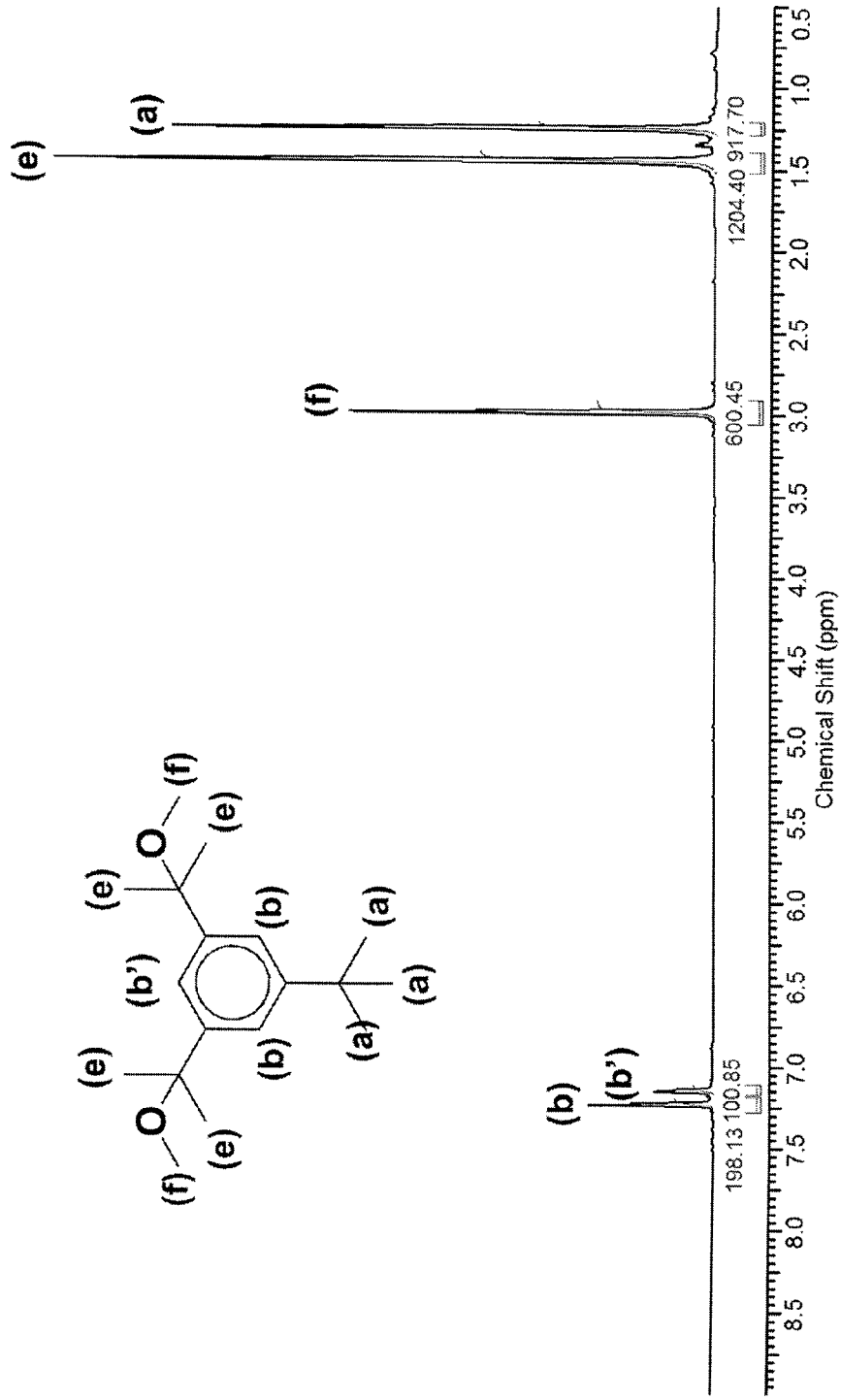
FIG. 2 is a $^1$H NMR spectrum of 5-tert-butyl-1,3-(2-methoxy-2-propyl)benzene.

$^1$H NMR spectroscopy (FIG. 2) showed resonances at 1.35, 3.00, and 7.2-7.3 ppm, characteristic of the methyl protons of tert-butyl group, the methyl protons of methoxy groups, and the aromatic protons, respectively.

Example 2

Preparation of U-PIB-U where U=V'/E

U-PIB-U where U=V'/E(V'/E-PIB-V'/E) can be readily obtained by initiating the polymerization of isobutylene with dimethyl-5-tert-butyl-1,3-benzyl dicarboxylate (DMTBBDC) difunctional initiator (XXV) under conventional (non-living) cationic polymerization conditions. A representative procedure to prepare V'/E-PIB-V'/E (Mn=3000 g/mol) is shown in Scheme 1, above and may be carried out in two steps as follows: First, polymerization of isobutylene with a DMTBBDC/TiCl$_4$ initiator system is carried out under a nitrogen atmosphere at –80° C. Thus, into a 500 mL round bottom flask equipped with magnetic stirrer are placed 51 mL hexane and 30 mL CH$_2$Cl$_2$ and the stirred system is cooled to –80° C. Then solutions of 0.04 g ditertiarybutylpyridine (DTBP) in 4 mL hexane, 0.31 g DMTBBDC in 5 mL hexane, and 6 g isobutylene are added and the system is stirred for 5 min. The polymerization is initiated by the addition of 6.0 mL (1.0 M) TiCl$_4$. After 30 min the polymerization is quenched with prechilled methanol and the product (XXVI) is isolated and purified. The PIB formed contains tert-Cl end groups. Second, the product is dissolved in ~100 mL tetrahydrofuran, and the solution is refluxed. Dehydrochlorination is accomplished by the addition of t-BuOK according the well-known procedure. The product of dehydrochlorination is a mixture of exo and endo end groups (V'/E-PIB-V'/E) (IX, X, XI) in high yield, as determined by proton NMR spectroscopy.

Example 3

Synthesis of Allyl-Telechelic PIB (A-PIB A) Using the TBDMPB Initiator

A representative strategy for preparing the allyl-telechelic PIB (A-PIB-A) using a TBDMPB initiator is set forth in Scheme 6 below.

Scheme 6

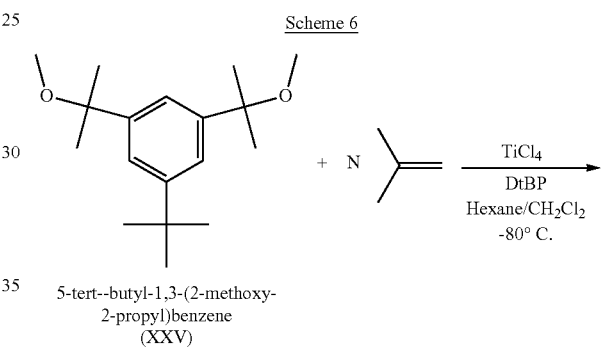

5-tert--butyl-1,3-(2-methoxy-2-propyl)benzene
(XXV)

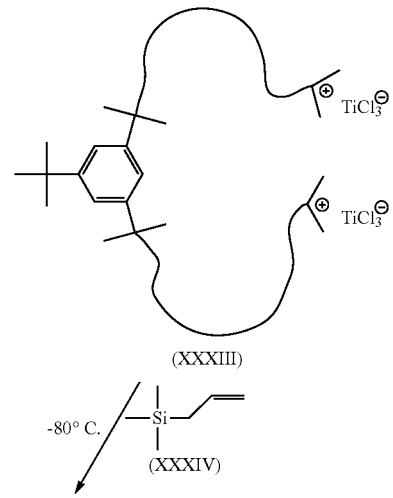

(XII)

Figure 4:
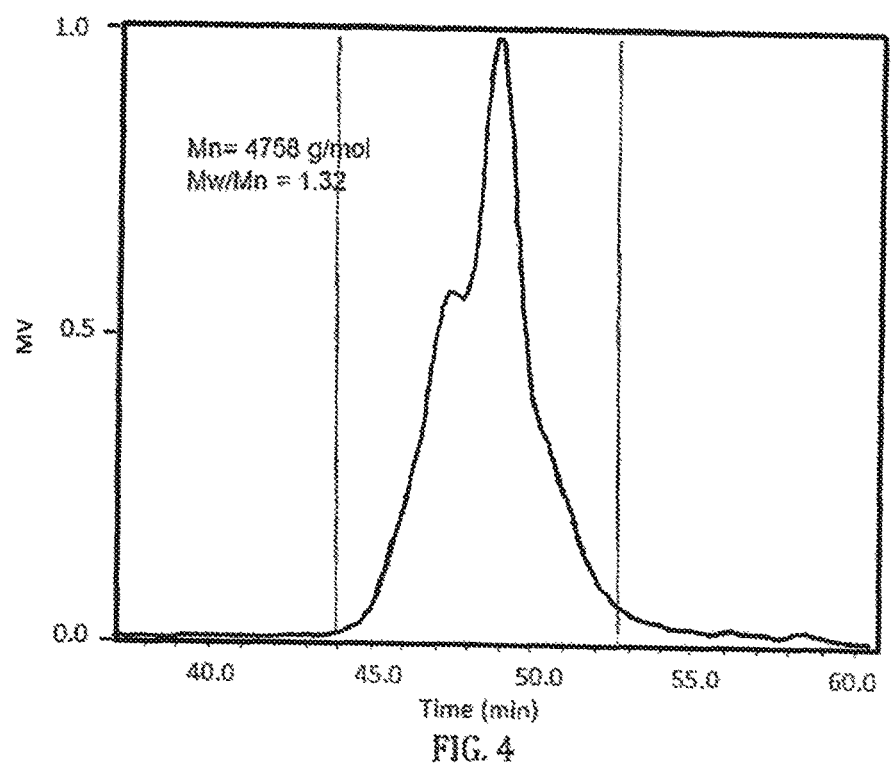
FIG. 4 is a GPC trace of A-PIB-A.

The polymerization of isobutylene was carried out in a high vacuum/dry nitrogen line at −80° C. as follows. Into a 500 mL round bottom flask equipped with a magnetic stirrer were placed 180 mL dried and distilled hexane, 120 mL dried and distilled dichloromethane, and ditertbutylpyridine (DTBP)(1.25×10$^{-3}$ mol), and the system was cooled to −80° C. Under strong stirring, 1.25×10$^{-2}$ mol of the TBDMPB initiator (XXV) was added and over a period of 5 min. Then 0.45 mol of isobutylene was added followed by the immediate addition of 3.75×10$^{-2}$ mol of TiCl$_4$. The polymerization was allowed to proceed for 60 min and then terminated with 0.25 mol distilled and prechilled allyltrimethylsilane (ATM) (XXXIV). After 30 min, the dichloromethane was evaporated under reduced pressure, the product was poured into 200 ml saturated aqueous NaHCO$_3$. The organic layer was then separated and the solvent evaporated under reduced pressure. The reaction product (polymer) (XII) was dissolved in hexane and dried over MgSO$_4$ overnight. After filtration and evaporation of the solvent by a rotavap, the polymer was dried in vacuo. The product was characterized by $^1$H NMR spectroscopy (FIG. 3) and gel permeation chromatography (GPC) (FIG. 4).

The observed resonances in the $^1$H NMR spectrum (FIG. 3) indicate the presence of allyl end groups (5.10 and 5.85 ppm) and the methylene protons of PIB (2.00 ppm). Molecular weight and functionality calculated from $^1$H NMR data were 4280 g/mol and 90-92%, respectively. The GPC chromatogram (FIG. 4) showed bimodal molecular weight distribution with a heterogeneity index 1.32.

Example 4

Extension of V'/E-PIB-V'/E to Higher Molecular Weight PIBs by Thiol-Ene Click Reactions Scheme 2 above provides an example of the structures of the starting materials and the products obtained when V'/E-PIB-V'/E mixtures are combined with dithiols containing aromatic or aliphatic groups, such as 1,4-benzenedimethanethiol (BDMTh) and 1,2-ethanedithiol (EDTh), and then either exposed to UV light (in the presence of a catalyst) or to heat (in the presence of a radical initiator).

A representative synthesis procedure is as follows (for details see Table 1): V'/E-PIB-V'/E (see above), 2,2-dimethoxy-2-phenyl acetophenone (DMPA), and CH$_2$Cl$_2$ were charged to a 50 mL round bottom glass flask under a nitrogen atmosphere. Subsequently, EDTh was added to the solution and the system is stirred 30 min. Then the system was irradiated by a medium pressure Hg lamp for 60 min in an ice bath. The solvent was removed under reduced pressure and the crude reaction mixture was dissolved in hexane. The resulting solution was washed three times with methanol and placed under reduced pressure until constant weight is achieved.

TABLE 1

Synthesis details of the thiol-ene click reaction

| Sample | V'/E-PIB-V'/E (3000 g/mol) | EDTh (g) | CH$_2$Cl$_2$ (mL) | DMPA (mg) | Time (min) |
|---|---|---|---|---|---|
| V'/E-PIB-V'/E + EDTh (1:1 mole ratio) 40 Watt (0-5° C.) | 1.1325 g | 0.025 0.2638 mmol | 2.64 | 78 | 60 |

The product is characterized by $^1$H NMR spectroscopy. The resonances corresponding to the endo olefin proton at 5.1 and exo olefin protons at 4.6 and 4.8 ppm in V'/E-PIB-V'/E are absent. New resonances at 2.52 and 2.35 ppm, and at 2.0 and 2.75 ppm are observed due to the thiol-ene adduct of the exo and endo unsaturations, respectively.

While in the present example uses a V'/E-PIB-V'/E polymer mixture (U=V'/E), it should be appreciated that the same procedure can also be carried out with U-PIB-U, where U is an allyl end group. Moreover, the thiol-ene click reaction can also affected by H$_2$S in which case the extended PIB contains —S— connecting bonds:

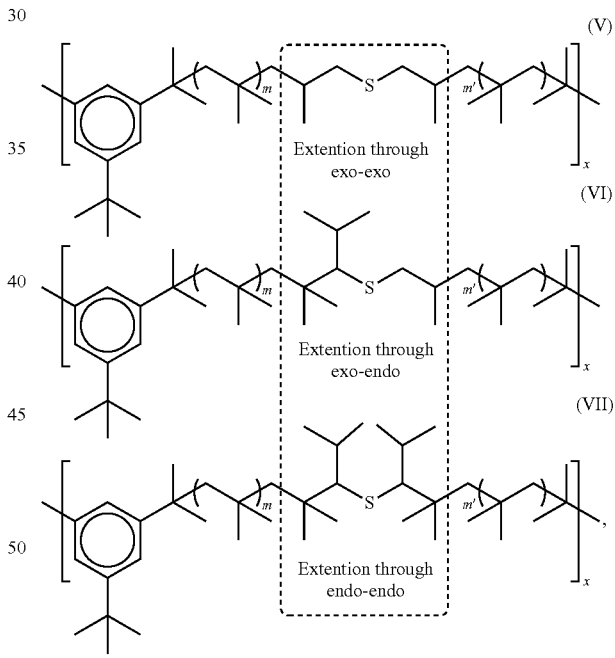

as described above.

It is believed that these structures are new compositions of matter.

Example 5

Preparation of PIB Networks by the Use of V'/E-PIB-V'/E and Multifunctional Thiols Using the Thiol-Ene Reaction Scheme 3 shows the formation and structures of PIB-based networks obtained when V'/E-PIB-V'/E polymer mixtures are contacted with a multi-functional thiol containing aromatic or aliphatic groups, such as 1,3,5-benzenetrimethanethiol (BTMTh) and 2,2-bis(mercaptomethyl)-1,3-propanedithiol (BMMPTh), and the combination is either exposed to UV light (in the presence of a catalyst) or to heat (in the presence of a radical initiator).

The formula in Scheme 3 shows the structure of a PIB network formed with a tetrafunctional thiol. The same procedure can also be carried out with U-PIB-U, where U=allyl. These structures are believed to be new compositions.

In light of the foregoing, it should be appreciated that the present invention significantly advances the art by providing higher molecular weight linear PIBs and PIB networks that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A polyisobutylene-based polymer network comprising the thiol-ene reaction product of:
    at least two telechelic multi-functional polyisobutylene polymer precursor moieties, each telechelic multi-functional polyisobutylene polymer precursor moiety having at least two end group selected from the end groups —CH$_2$—C(CH$_3$)=CH$_2$, —CH=C(CH$_3$)$_2$, and —CH$_2$—CH=CH$_2$, and
    at least one multi-functional thiol having a sulfur atom and at least two functional groups, in the presence of light or heat;
    wherein when each telechelic multi-functional polyisobutylene polymer precursor moiety has two end groups, then the at least one multi-functional thiol has three or more functional groups, and wherein when the at least one multi-functional thiol has two functional groups, then each telechelic multi-functional polyisobutylene polymer precursor moiety has three or more end groups; and
    wherein the at least one multi-functional thiol is selected from the formulas:

H—S—H,

wherein n is an integer from 1 to 12,

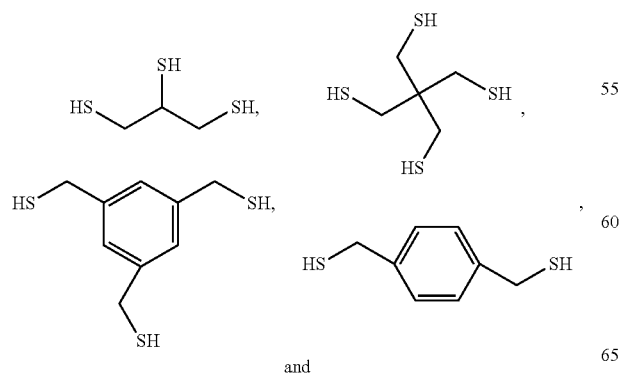

and

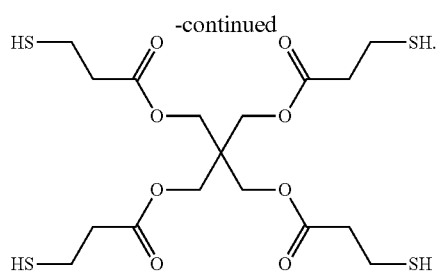

2. The polyisobutylene-based polymer network of claim 1 wherein each telechelic multi-functional polyisobutylene polymer precursor moiety comprises a core and at least two polyisobutylene chains extending from the core, wherein each of the at least two polyisobutylene chains have an end group selected from the end groups —CH$_2$—C(CH$_3$)=CH$_2$, —CH=C(CH$_3$)$_2$, and —CH$_2$—CH=CH$_2$.

3. The polyisobutylene-based polymer network of claim 2, wherein the core is an aromatic initiator core.

4. The polyisobutylene-based polymer network of claim 3, wherein said initiator core is formed from dimethyl-5-tert-butyl-1,3-benzyl dicarboxylate.

5. The polyisobutylene-based polymer network of claim 1, wherein each polyisobutylene polymer precursor moiety has a formula selected from:

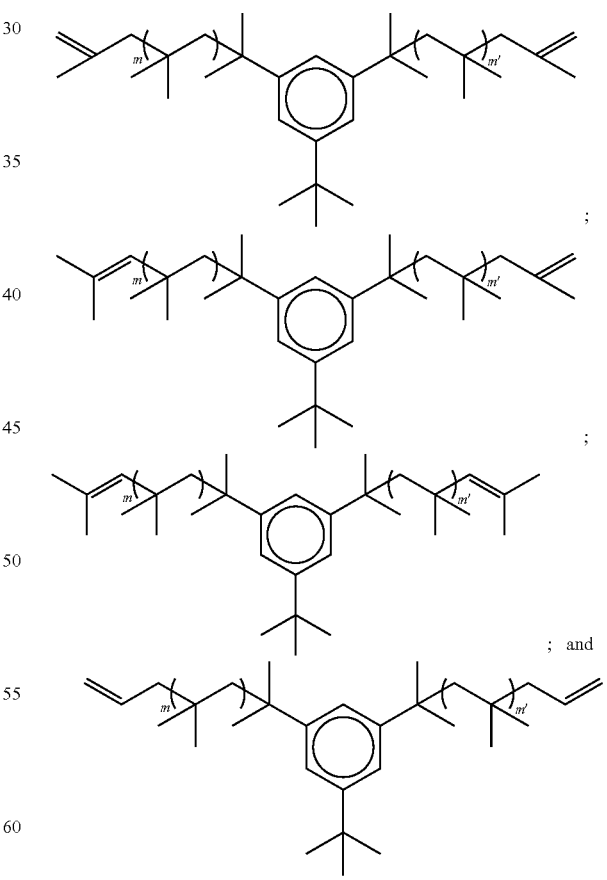

wherein m and m' are each an integer from 2 to 5,000.

6. The polyisobutylene-based polymer network of claim 2, wherein each polyisobutylene polymer precursor moiety comprises at least three polyisobutylene chains extending from a core, wherein each of the at least three polyisobutylene chains have an end group selected from the end groups —CH$_2$—C(CH$_3$)=CH$_2$, —CH=C(CH$_3$)$_2$, and —CH$_2$—CH=CH$_2$.

7. The polyisobutylene-based polymer network of claim 6, wherein each polyisobutylene polymer precursor moiety has a formula selected from:

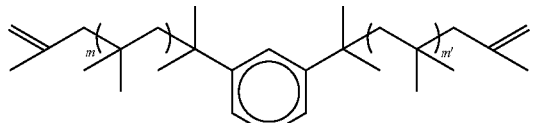

;

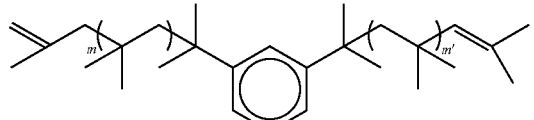

;

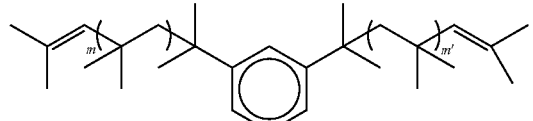

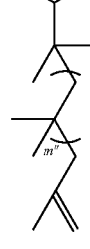

;

-continued

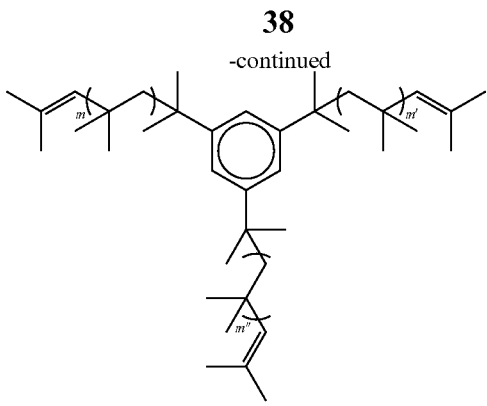

; and

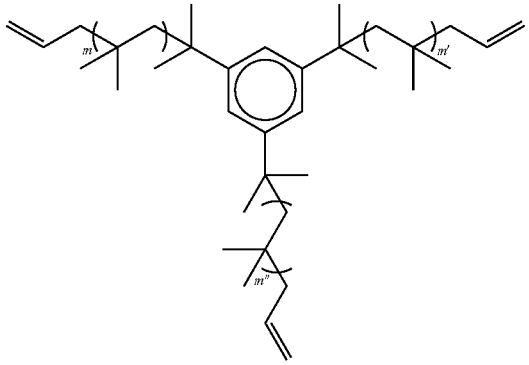

wherein m, m' and m" are each one an integer from 2 to 5,000.

8. A PIB-based polymer network comprising at least one sulfur containing segment and at least two PIB polymer segments, wherein the at least two PIB polymer segments each include a core and at least two polyisobutylene polymer chains extending therefrom, the at least one sulfur containing segment includes at least two sulfur atoms that are located between any two polyisobutylene polymer chains from two different PIB polymer segments, the sulfur containing segment connecting those two different PIB polymer segments together; and wherein the PIB-based polymer network has a formula selected from:

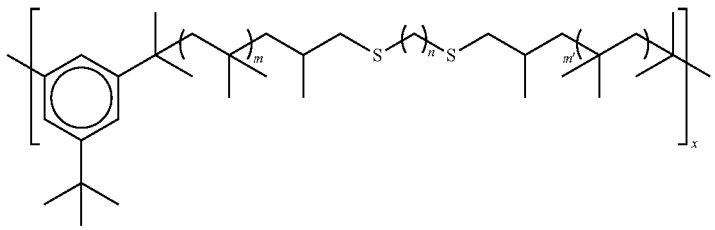

;

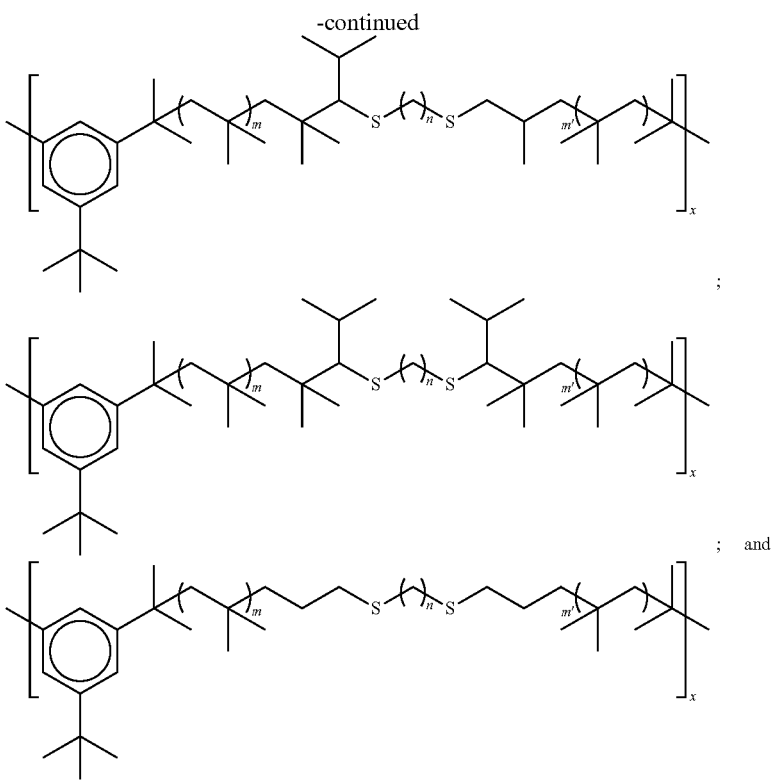

wherein m, m', and X are each an integer from 2 to 5,000 and n is an integer from 1 to 12.

9. A PIB-based polymer network comprising at least one sulfur containing segment and at least two PIB polymer segments, wherein the at least two PIB polymer segments each include a core and at least two polyisobutylene polymer chains extending therefrom, the at least one sulfur containing segment includes only one sulfur atom that is located between any two polyisobutylene polymer chains from two different PIB polymer segments, the sulfur containing segment connecting those two different PIB polymer segments together; and wherein the PIB-based polymer network having a formula selected from:

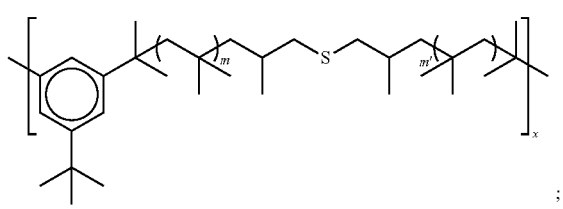

;

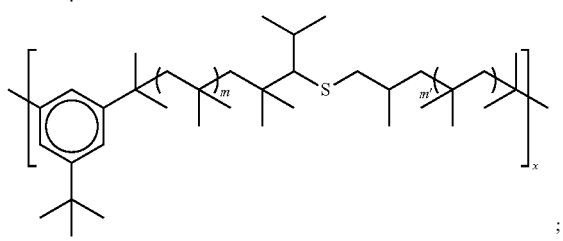

;

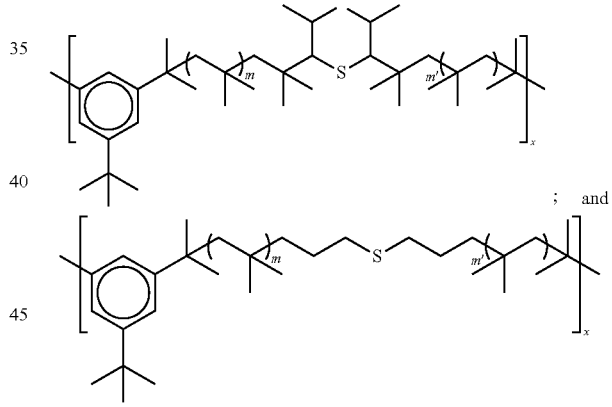

; and wherein m, m', and X are each an integer from 2 to 5,000.

10. A method for creating a PIB-based polymer network, the method comprising:
providing at least two telechelic multi-functional polyisobutylene polymer precursor moieties, each polyisobutylene polymer precursor moiety having at least two end groups selected from the end groups —CH$_2$—C(CH$_3$)=CH$_2$, —CH=C(CH$_3$)$_2$, and —CH$_2$—CH=CH$_2$;
adding at least one multi-functional thiol with the at least two polyisobutylene polymer precursor moieties to form a mixture, wherein either the at least two telechelic multi-functional polyisobutylene polymer precursor moieties or the at least one multi-functional thiol has three to more functional groups;
irradiating the mixture with light or heat, so as to provide a thiol-ene reaction, thereby producing the PIB-based polymer network; and wherein the at least one multi-functional thiol is selected from the formulas:

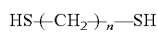

wherein n is an integer from 1 to 12,

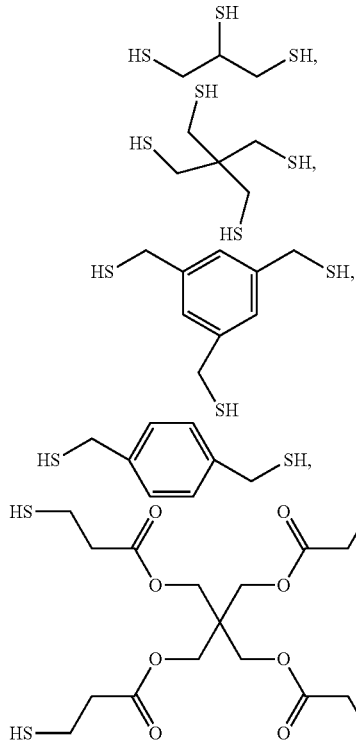

and

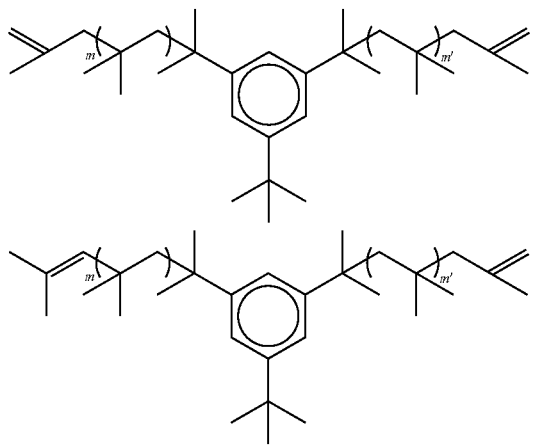

11. The method of claim 10, wherein each polyisobutylene polymer precursor moiety comprises an initiator core and at least two polyisobutylene chains extending from the initiator core, wherein each of the at least two polyisobutylene chains have an end group selected from the groups —CH$_2$—C(CH$_3$)=CH$_2$, —CH=C(CH$_3$)$_2$, and —CH$_2$—CH=CH$_2$.

12. The method of claim 10, wherein each polyisobutylene polymer precursor moiety has a formula selected from:

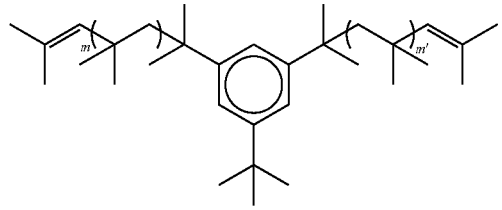

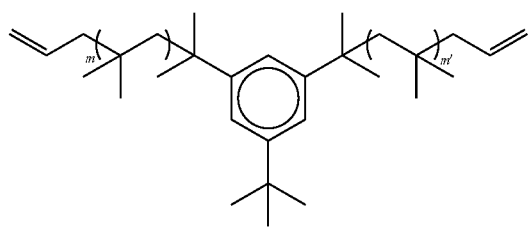

;

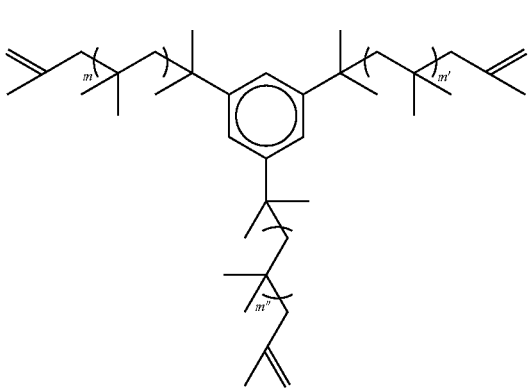

; and wherein m and m' are each an integer from 2 to 5,000.

13. The method of claim 10, wherein each polyisobutylene polymer precursor moiety has a formula selected from:

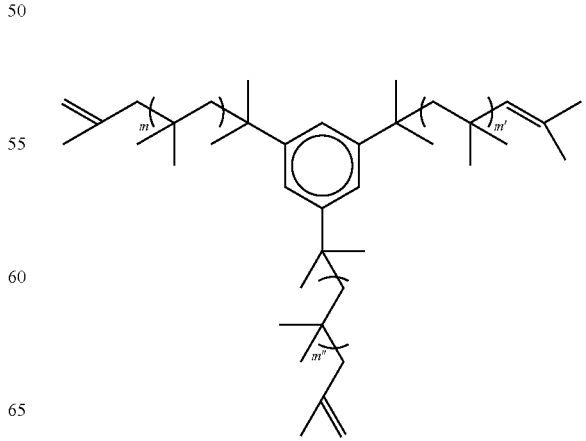

;

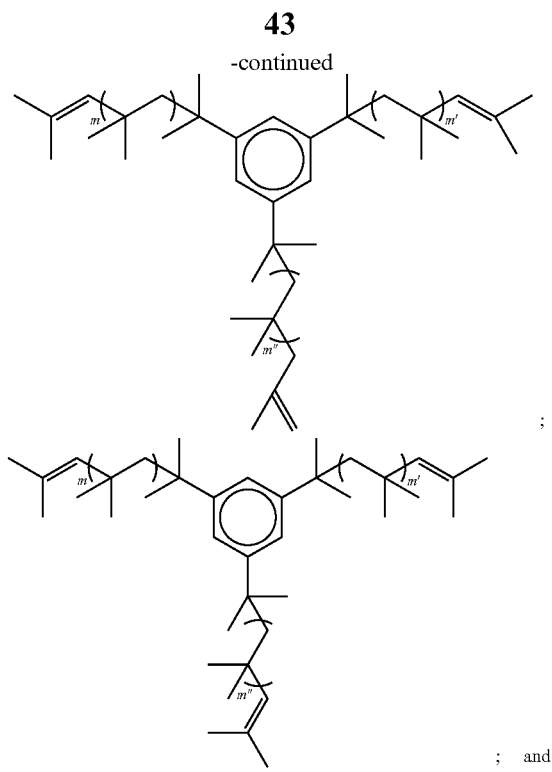
;  and
wherein m, m' and m" are each one an integer from 2 to 5,000.
14. The method of claim 10, wherein the step of irradiating includes heating the mixture in the presence of a free radical initiator to produce the polymer network.
* * * * *